(12) United States Patent
Takeyama et al.

(10) Patent No.: US 8,077,383 B2
(45) Date of Patent: Dec. 13, 2011

(54) OPTICAL AMPLIFIER

(75) Inventors: Tomoaki Takeyama, Kawasaki (JP);
Keiko Sasaki, Kawasaki (JP);
Shinichirou Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 933 days.

(21) Appl. No.: 12/053,816

(22) Filed: Mar. 24, 2008

(65) Prior Publication Data

US 2008/0239467 A1 Oct. 2, 2008

(30) Foreign Application Priority Data

Mar. 29, 2007 (JP) ................................. 2007-089397

(51) Int. Cl.
*H01S 3/00* (2006.01)
(52) U.S. Cl. .............. 359/337.4; 359/337.1; 359/341.42
(58) Field of Classification Search ............... 359/337.4, 359/337.1, 341.41, 341.42
See application file for complete search history.

(56) References Cited

U.S. PATENT DOCUMENTS

| 5,633,750 | A | * | 5/1997 | Nogiwa et al. | ........... 359/341.41 |
| 5,903,385 | A | | 5/1999 | Sugaya et al. | |
| 6,507,431 | B1 | | 1/2003 | Sugaya et al. | |
| 2002/0024723 | A1 | | 2/2002 | Sekiya et al. | |
| 2003/0231379 | A1 | * | 12/2003 | Komaki et al. | ........... 359/337.4 |
| 2005/0078358 | A1 | * | 4/2005 | Sato et al. | ................... 359/337.4 |

FOREIGN PATENT DOCUMENTS

| JP | 04-361583 | 12/1992 |
| JP | 5-206555 | 8/1993 |
| JP | 6-164021 | 6/1994 |
| JP | 9-214034 | 8/1997 |
| JP | 10-257028 | 9/1998 |
| JP | 10-284788 | 10/1998 |
| JP | 11-307851 | 11/1999 |
| JP | 2001-244528 | 9/2001 |
| JP | 2004-6887 | 1/2004 |
| JP | 2006-245334 | 9/2006 |

OTHER PUBLICATIONS

Japanese Office Action dated Dec. 22, 2009 in corresponding Japanese Patent Application 2007-089397.

* cited by examiner

*Primary Examiner* — Mark Hellner
(74) *Attorney, Agent, or Firm* — Staas & Halsey LLP

(57) ABSTRACT

An optical amplifier including: a first amplifying unit amplifying an input light by utilizing a first excitation light and thereby outputting a first amplified light; a second amplifying unit amplifying the first amplified light by utilizing a second excitation light and thereby outputting a second amplified light; and a control unit detecting a first absorption rate of the first excitation light and a second absorption rate of the second excitation light, and controlling a level of the first excitation light and a level of second excitation light based on the first absorption rate and the second absorption rate. The first absorption rate corresponds to a ratio of the first excitation light absorbed in the first amplifying unit, and the second absorption rate corresponds to a ratio of the second excitation light absorbed in the second amplifying unit.

16 Claims, 24 Drawing Sheets

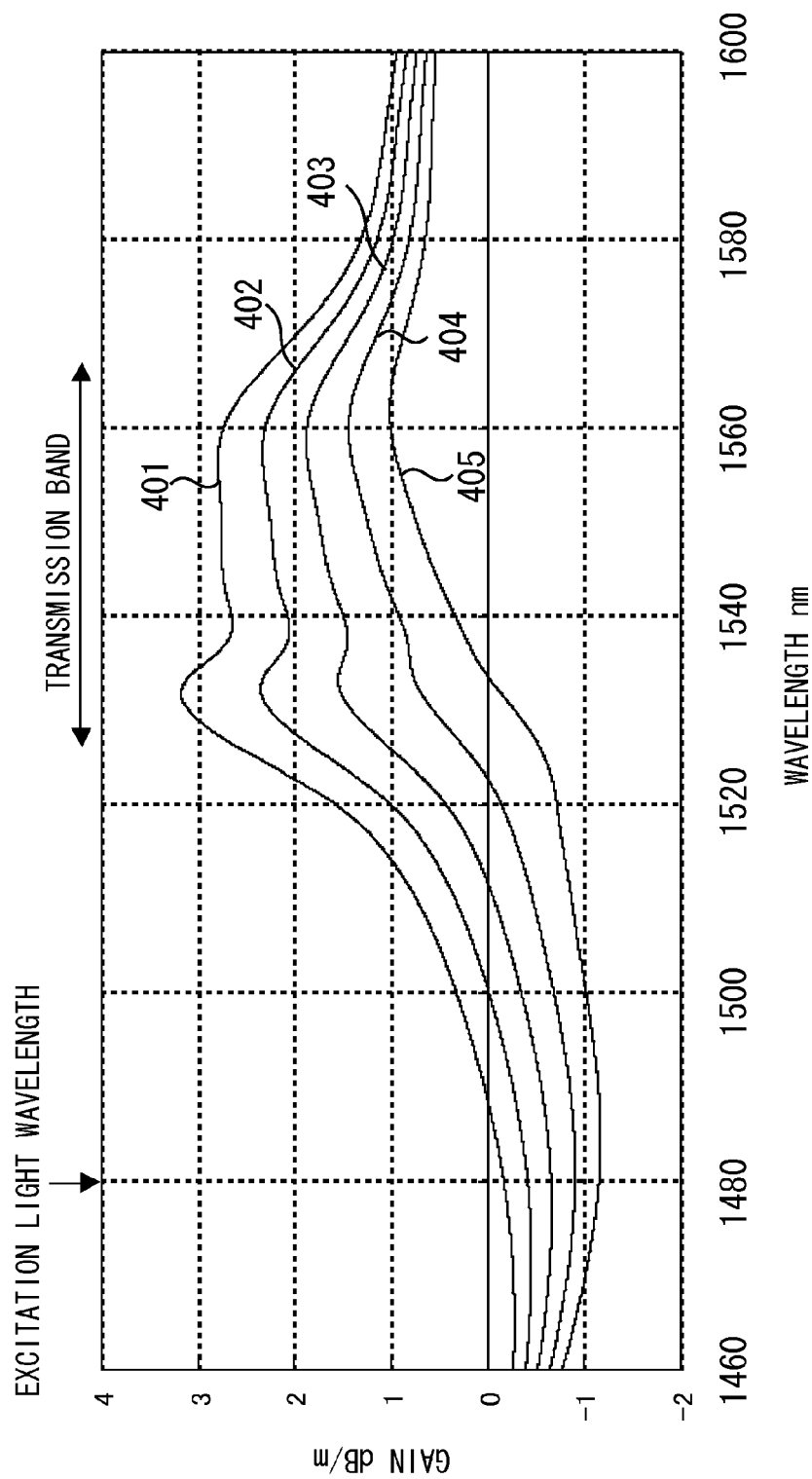

FIG. 15

| | | | | |
|---|---|---|---|---|
| | INPUT LEVEL | dBm/ch | −30 | −15 |
| FRONT STAGE | INPUT EXCITATION LIGHT POWER | dBm | 24.5 | 24.5 |
| | RESIDUAL EXCITATION LIGHT POWER | dBm | 23.5 | 20.7 |
| | EXCITATION LIGHT ABSORPTION RATE | dB | 0.9 | 3.8 |
| REAR STAGE | INPUT EXCITATION LIGHT POWER | dBm | 19.7 | 20.3 |
| | RESIDUAL EXCITATION LIGHT POWER | dBm | 9.4 | 12.9 |
| | EXCITATION LIGHT ABSORPTION RATE | dB | 10.3 | 7.4 |
| FRONT STAGE/REAR STAGE | SUM OF EXCITATION LIGHT ABSORPTION RATES | dB | 11.2 | 11.2 |

OPTICAL AMPLIFIER

The present invention claims foreign priority to Japanese application 2007-089397, filed on Mar. 29, 2007, which is incorporated herein by reference in its entirety.

DESCRIPTION OF THE RELATED ART

With the development of a multimedia network, traffic demands for telecommunication are drastically increasing, and an optical communication system that utilizes a WDM (Wavelength Division Multiplexing) and optical amplification in a multi-relay style by optical amplifying devices have played an important role in communication systems in a multimedia society.

A transmission loss estimated in the WDM transmission system is in a wide range, about 0 to 20 dB. When applying an optical amplifying device for compensating for the wide range of transmission loss in the WDM transmission system, various types of optical amplifying devices (i.e., optical amplifiers) are prepared in the form of a menu so as to be selectable in accordance with a compensation amount to a transmission loss which is required at an applied place.

However, when many types of optical amplifying devices are prepared in the menu style, it induces a cost problem. The costs related are storing costs for many kinds of stocks, labor costs, and designing costs about selecting types of the optical amplifying devices. Therefore, compensating a broad range transmission loss by a small number of types of optical amplifying devices is required.

Such requirements correspond to a broad input dynamic range in optical amplifiers and there are three performance requirements for optical amplifying devices operation; constant output power, a flat gain-wavelength characteristic, and a low noise figure (NF).

Implementing the performance required to the optical amplifying device used in the WDM transmission system, optical amplifiers having a two-stage structure with a variable optical attenuator (VOA) between a front-stage amplifying unit and a rear-stage are standard configuration in the WDM transmission system, with each stage having an EDF (Erbium Doped Fiber), as shown in Japanese Patent JP3551418, for example. In this configuration, a variable optical attenuator (VOA) is used, though attenuation by VOA contradicts amplification by EDF, for fulfilling the requirements.

When designing an optical amplifying device which can obtain a predetermined output level without using any optical amplifier having the two-stage structure, the following three amplifying methods are known.

(1) In the first method, as shown in FIG. 17A and FIG. 17B, an optical amplifying device is constructed as an optical amplifying unit having an amplifying medium 12 formed of EDF and an excitation light source 13. A WDM coupler 11 combines excitation light output from the excitation light source 13 and input WDM light and inputs the combined light to the amplifying medium 12.

When the input level (power per wavelength) of the amplifying medium 12 varies, for example, varies from I1 to I2, it is required to reduce the gain in order to maintain the output level Pi. Therefore, the excitation light power is varied. In this method, the variation of the gain causes a variation of the gain-wavelength characteristic, and thereby results in a power level characteristic change of the WDM light.

(2) In the second method, as shown in FIG. 18A and FIG. 18B, an optical amplifying device is constructed by an optical amplifying unit 21 which includes EDF and an excitation light source and VOA 22 disposed at the rear stage of the optical amplifying unit 21. The amplifying unit 21 is subjected to a gain fixing control (Automatic Gain Control: AGC).

In the method, the gain can be controlled to be constant irrespective of the input level, and the gain-wavelength characteristic can be also constant. However, when the input level is a relatively high level 12, it is required to set the excitation light power to a relatively high value because the amplifying unit is controlled in the gain fixing control (automatic gain control), and accordingly VOA 22 attenuates the light having high level that is amplified by high excitation light power. Therefore, efficient use of the excitation light power is obstructed.

(3) In the third method, as shown in FIG. 19A and FIG. 19B, an optical amplifying device is constructed by VGA 31 and an optical amplifying unit 32 which is disposed at the rear stage of VOA 31 and has the same configuration as the optical amplifying unit 21 of FIG. 18A. In this case, an input light is attenuated before it is amplified, and thus NF is deteriorated even after the light power is amplified by the optical amplifying unit 32 at the rear stage.

Referring the standard configuration, as shown in FIG. 20A and FIG. 20B, VOA 42 is interposed between optical amplifying units at the front and rear stages. According to this configuration, two optical amplifying units 41 and 43 which are subjected to gain fixing control (automatic gain control) are disposed at the front and rear stages, and VOA 42 performs output-level fixing control between the optical amplifying units 41 and 43.

In this case, the gain-wavelength characteristic can be constant by performing the gain fixing control (automatic gain control) while keeping the dynamic range of the input light level broad, and further excellent NF can be kept while the excitation light power is efficiently used. Accordingly, as compared with the foregoing configurations (1), (2), or (3), a more desirable optical amplifying device can be implemented.

FIG. 21 shows an example of the configuration of an optical amplifier to which the two-stage configuration as described above is applied. This optical amplifier includes beam splitters 51, 58, WDM couplers 52, 56, EDFs 53, 57, a gain equalizer (GEQ) 54, VOA 55, optical monitor circuits 59, 62, excitation light sources 60, 61, an AGC controller 63, a VOA attenuation amount determining circuit 64, an AGC target value determining circuit 65 and an input level calculator 66.

The WDM coupler 52, EDF 53 and the excitation light source 60 correspond to the optical amplifying unit at the front stage, and the WDM coupler 56, EDF 57 and the excitation light source 61 corresponds to the optical amplifying unit at the rear stage. The optical monitor circuit 59 detects the input light power input to the optical amplifying unit at the front stage, and the optical monitor circuit 62 detects the output light power output from the optical amplifying unit at the rear stage.

The input level calculator 66 divides the detected input light power by the wavelength number on the basis of wavelength number information 67 input from the external, and calculates the input level corresponding to the input light power per wavelength. The AGC target value determining circuit 65 determines a gain target value so that the output level does not vary with respect to the variation of the optical input level. The AGC controller 63 controls the excitation light sources 60 and 61 so that the ratio between the level of the input light input to the optical amplifying unit at the front stage and the level of the output light output from the optical amplifying unit at the rear stage, that is, the gain of the optical amplifier is constant.

The VOA attenuation amount determining circuit 64 changes the attenuation amount of VOA 55 provided between the front and rear stages in accordance with the variation of the optical input level, thereby controlling to keep a predetermined optical output level while the flatness of the output wavelength characteristic is maintained.

According to the gain fixing control (AGC; automatic gain control) of the AGC controller 63, as shown in FIG. 20A and FIG. 20B, the control response can be more enhanced while the control circuit is made to be shared as compared with the case where the gain fixing control is conducted on the optical amplifying units at the front and rear stages respectively.

Furthermore, the gain equalizer 54 is provided between the optical amplifying units at the front and rear stages, and the loss-wavelength characteristic corresponding to the gain-wavelength characteristic which is controlled to be constant by the optical amplifier is provided, whereby the gain flat on the wavelength axis of the optical level can be finally obtained.

FIG. 22 shows the gain-wavelength characteristic obtained by combining two EDFs of the optical amplifying units at the front and rear stages, and FIG. 23 shows the loss-wavelength characteristic of GEQ for compensating the gain-wavelength characteristic of the light. In this case, as shown in FIG. 24, the gain-wavelength characteristic of the output light from the optical amplifier can be flattened irrespective of the wavelength arrangement of the light.

SUMMARY

Described below is an optical amplifier including: a first amplifying unit amplifying an input light by utilizing a first excitation light and thereby outputting a first amplified light; a second amplifying unit amplifying the first amplified light by utilizing a second excitation light and thereby outputting a second amplified light; and a control unit detecting a first absorption rate of the first excitation light and a second absorption rate of the second excitation light, and controlling a level of the first excitation light and a level of second excitation light based on the first absorption rate and the second absorption rate. The first absorption rate corresponds to a ratio of the first excitation light absorbed in the first amplifying unit, and the second absorption rate corresponds to a ratio of the second excitation light absorbed in the second amplifying unit.

The above-described optical amplifier is an example. All embodiments are not limited to including all the feature in this example.

BRIEF DESCRIPTION OF THE DRAWINGS

FIG. 4 is a diagram showing a Gain-Wavelength characteristics of EDF;

FIG. 15 is a diagram showing an excitation light absorption rate;

DETAILED DESCRIPTION OF THE EMBODIMENTS

Figure 1:
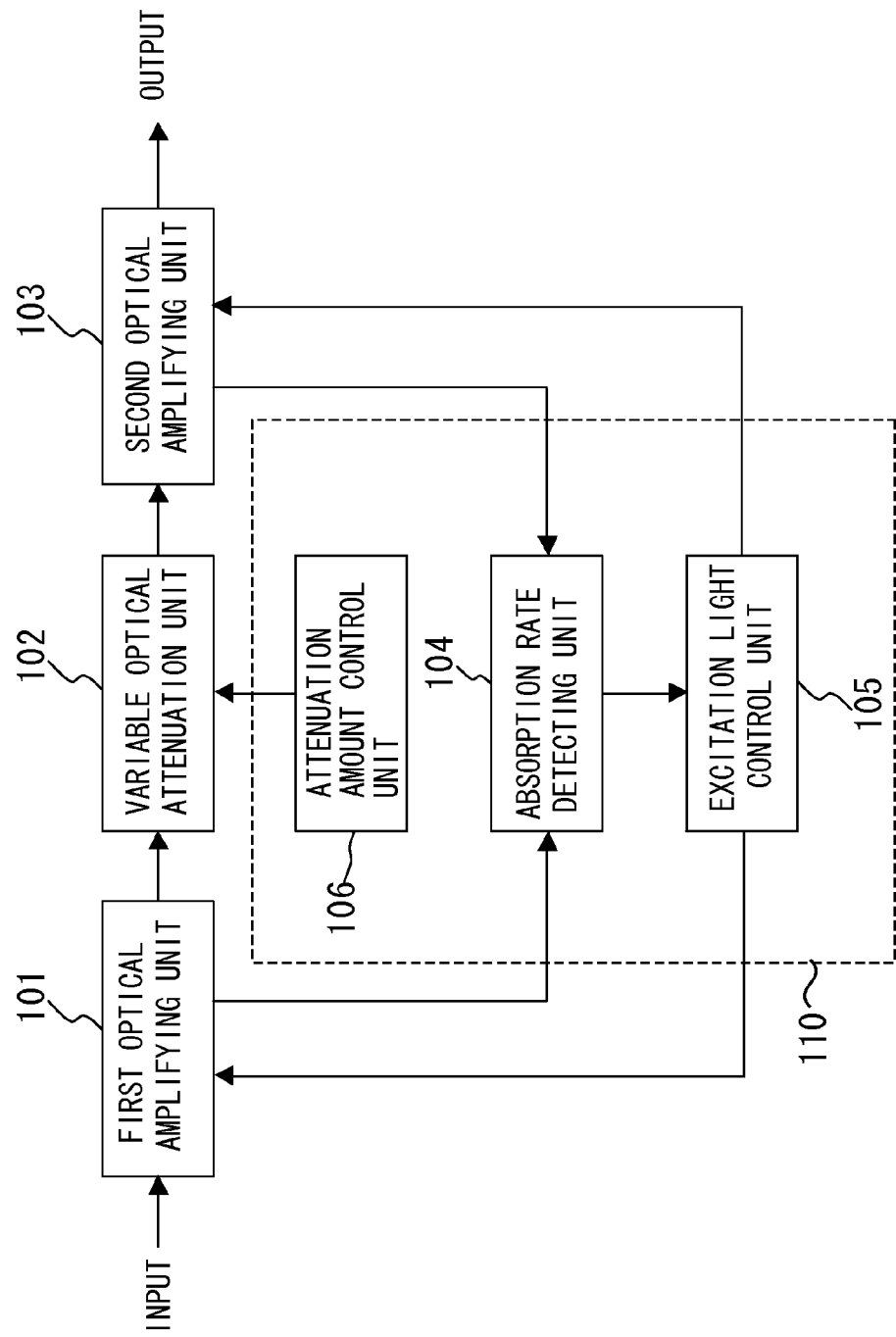
FIG. 1 is a diagram showing an optical amplifier according to an embodiment.

Reference will now be made in detail to embodiments of the present invention, examples of which are illustrated in the accompanying drawings, wherein like reference numerals refer to like elements throughout.

In a situation where numbers of multiplexed light in a WDM light and a power of each of the multiplexed light changes simultaneously, the optical amplifiers of related arts described above have a problem.

Figure 21:
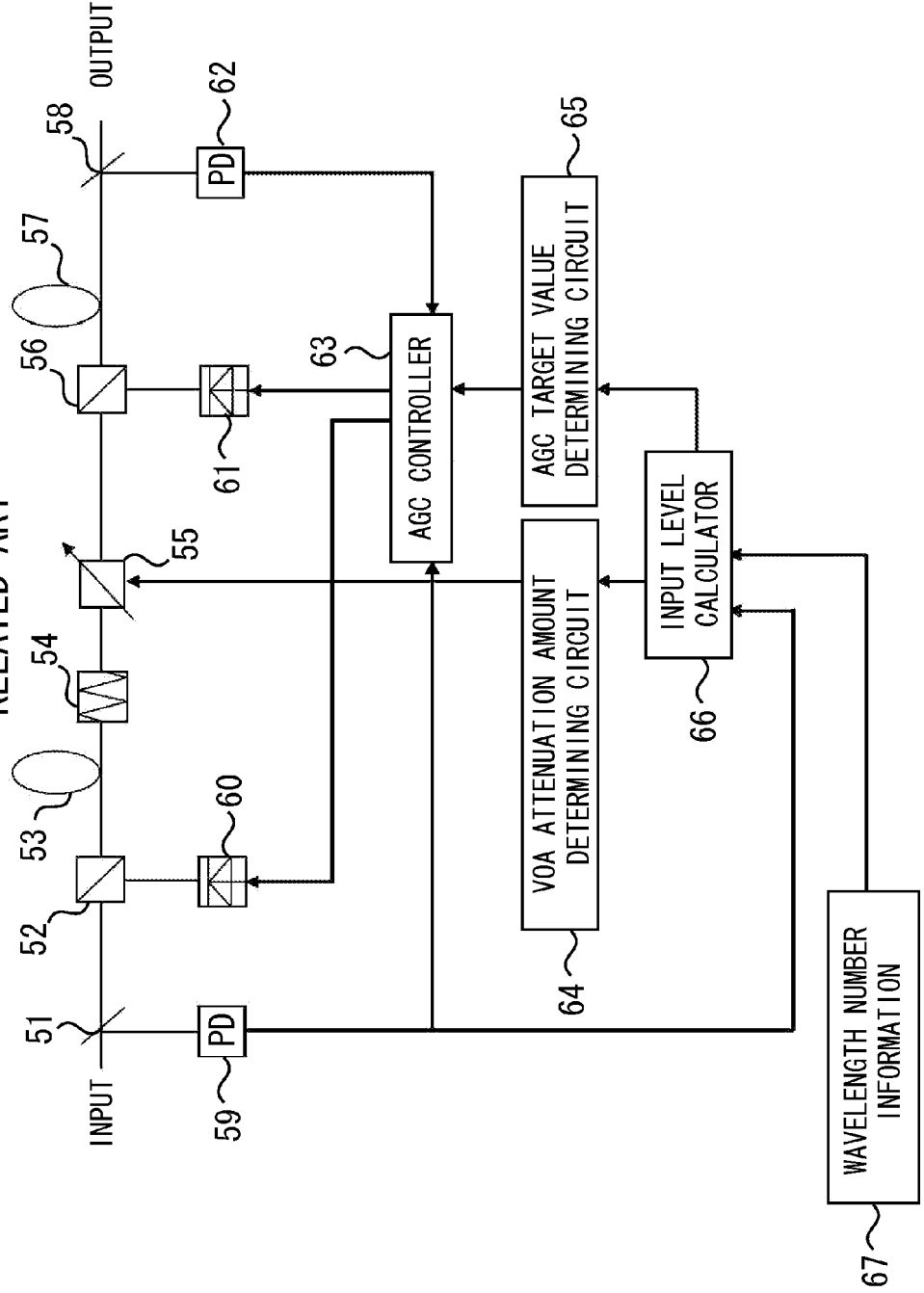
FIG. 21 is a diagram showing the configuration of a optical amplifier of an related art.
Figure 22:
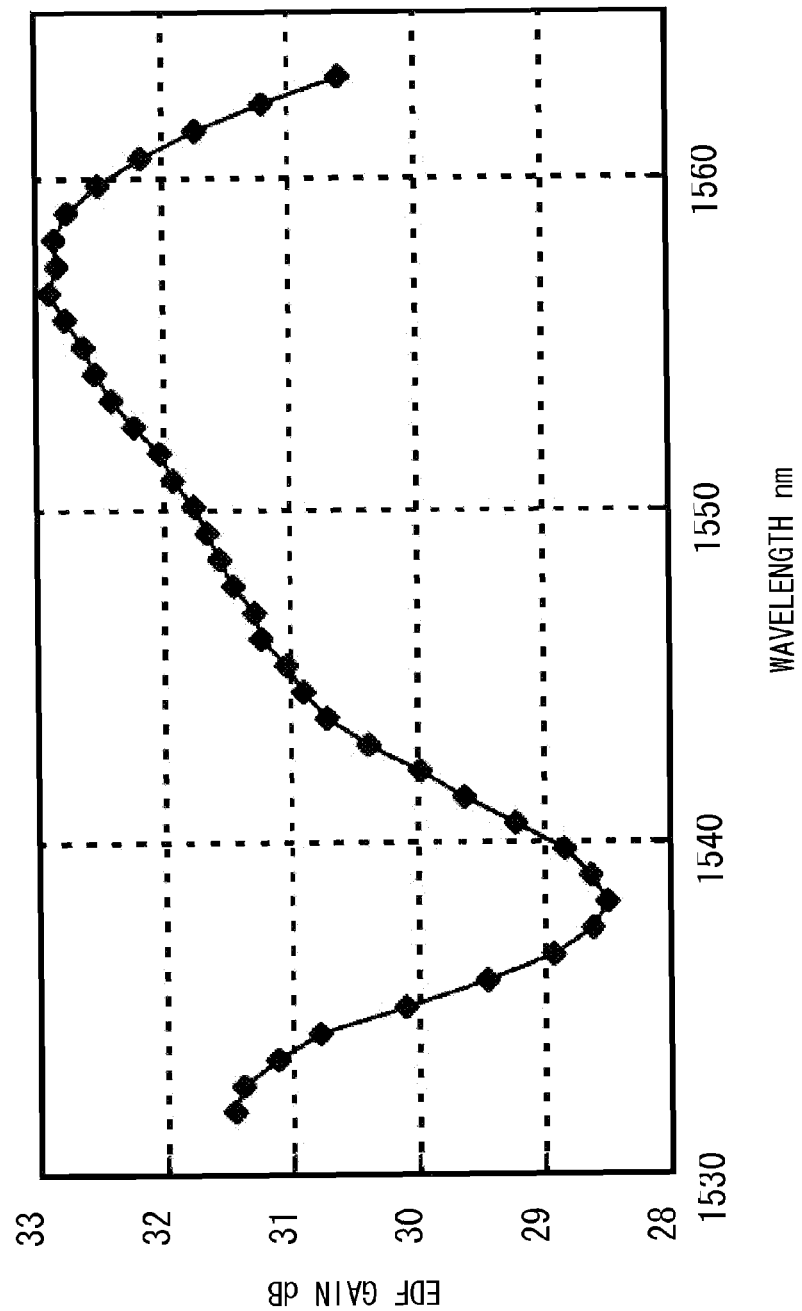
FIG. 22 is a diagram showing the gain-wavelength characteristic of EDF of an related art.
Figure 23:
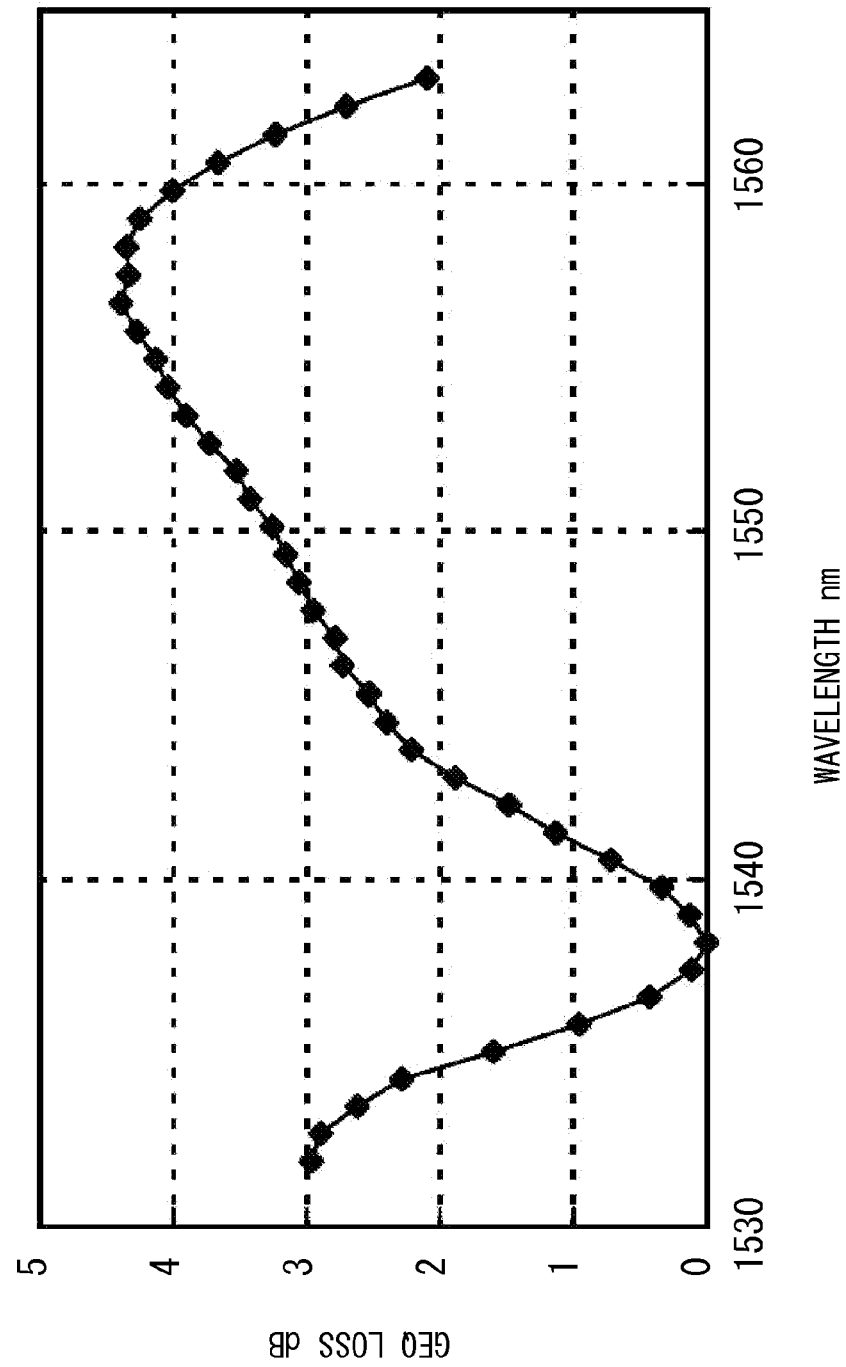
FIG. 23 is a diagram showing the loss-wavelength characteristic of GEQ of an related art.
Figure 24:
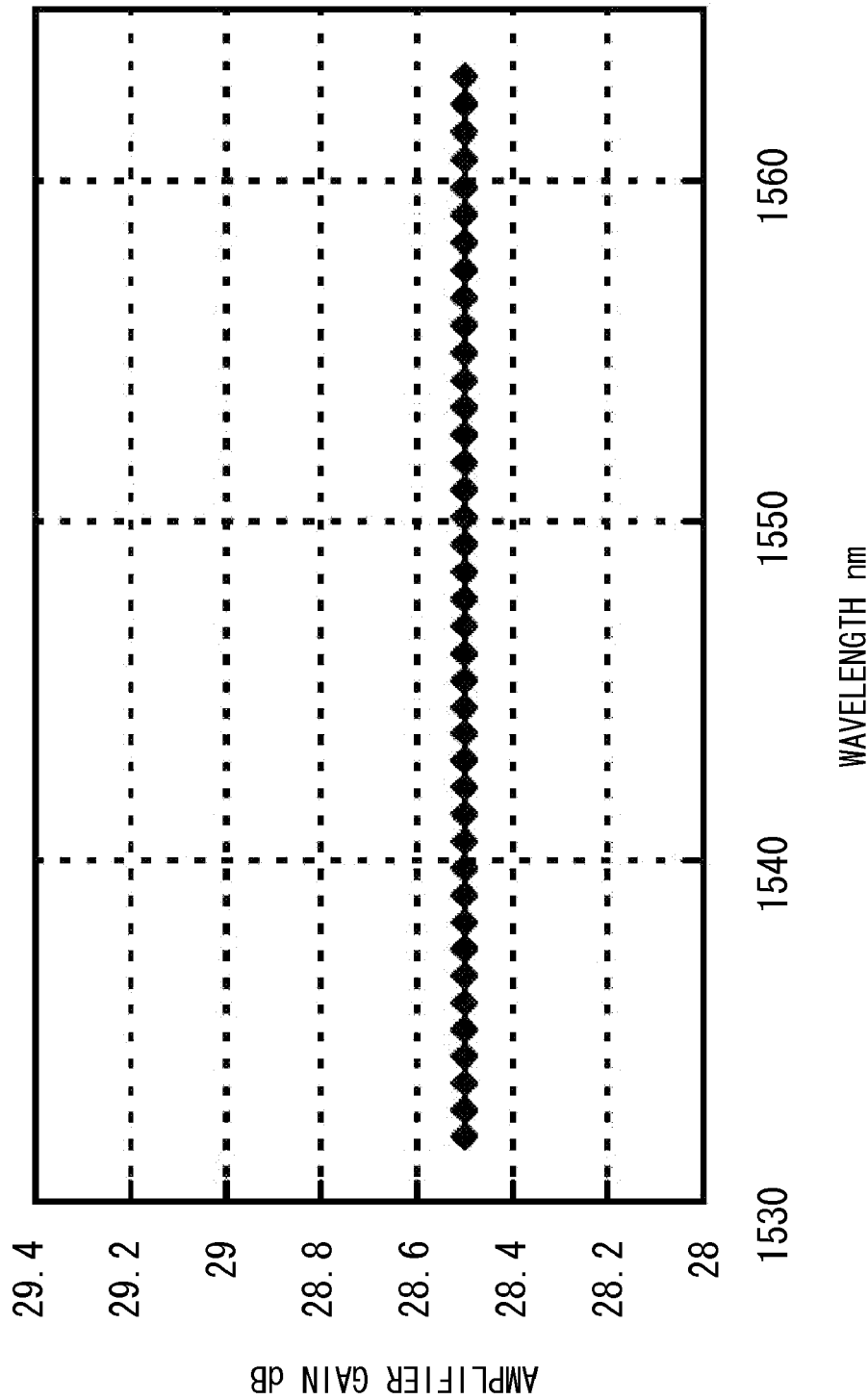
FIG. 24 is a diagram showing a flat gain-wavelength characteristic of an related art.

For example, if the number of multiplexed light wavelengths (wavelength number) changes from 40 to 1 (16 dB; 1/40) and the input level of the each of the multiplexed light changes by 15 dB, input it varies by totally 31 dB. As the dynamic range of the light power received by the optical monitor circuit 59 of FIG. 21 is very wide, and an electrical circuit detecting the input light adapted to the wide dynamic range becomes complicated and therefore sensitivity of the electrical circuit for the input light becomes worse at both the ends of the dynamic range.

FIG. 1 is a diagram showing the configuration of an optical amplifier according to an embodiment. An optical amplifier shown in FIG. 1 includes a first optical amplifying unit 101, a variable optical attenuation unit 102, a second optical amplifying unit 103, and a control unit 110. The control unit includes an absorption rate detecting unit 104, an excitation light control unit 105, and an attenuation amount control unit 106.

The first optical amplifying unit 101 amplifies input light by using first excitation light, the variable optical attenuation unit 102 attenuates a light output from the first optical amplifying unit 101, and the second optical amplifying unit 103 amplifies a light output from the variable optical attenuation unit 102 by using second excitation light.

The absorption rate detecting unit 104 detects an absorption rate information of the first excitation light in the first optical amplifying unit 101 and an absorption rate information of the second excitation light in the second optical amplifying unit 103. The excitation light control unit 105 controls a power of the first excitation light and a power of the second excitation light, by using the absorption rate information of the first excitation light and the absorption rate information of the second excitation light. The attenuation amount control unit 106 controls an attenuation amount of the variable light attenuation unit 102 so that the output level of light output from the second optical amplifying unit 103 is constant.

The absorption rate of the excitation light corresponds to an absorption amount (loss) of the excitation light in an amplification medium used for optical amplification. As described later, when the absorption rate of the excitation light is determined, a gain-wavelength characteristic of the amplification medium is determined. Therefore, if the absorption rates of the first and second excitation light are known, sum of the gains of the first optical amplifying unit 101 and the second optical amplifying unit 103 can be controlled to be kept constant. With the variable optical attenuation unit 102 attenuating the input light to the second optical amplifying unit 103, output level can be controlled to a constant level even when the input level varies.

Figure 2:
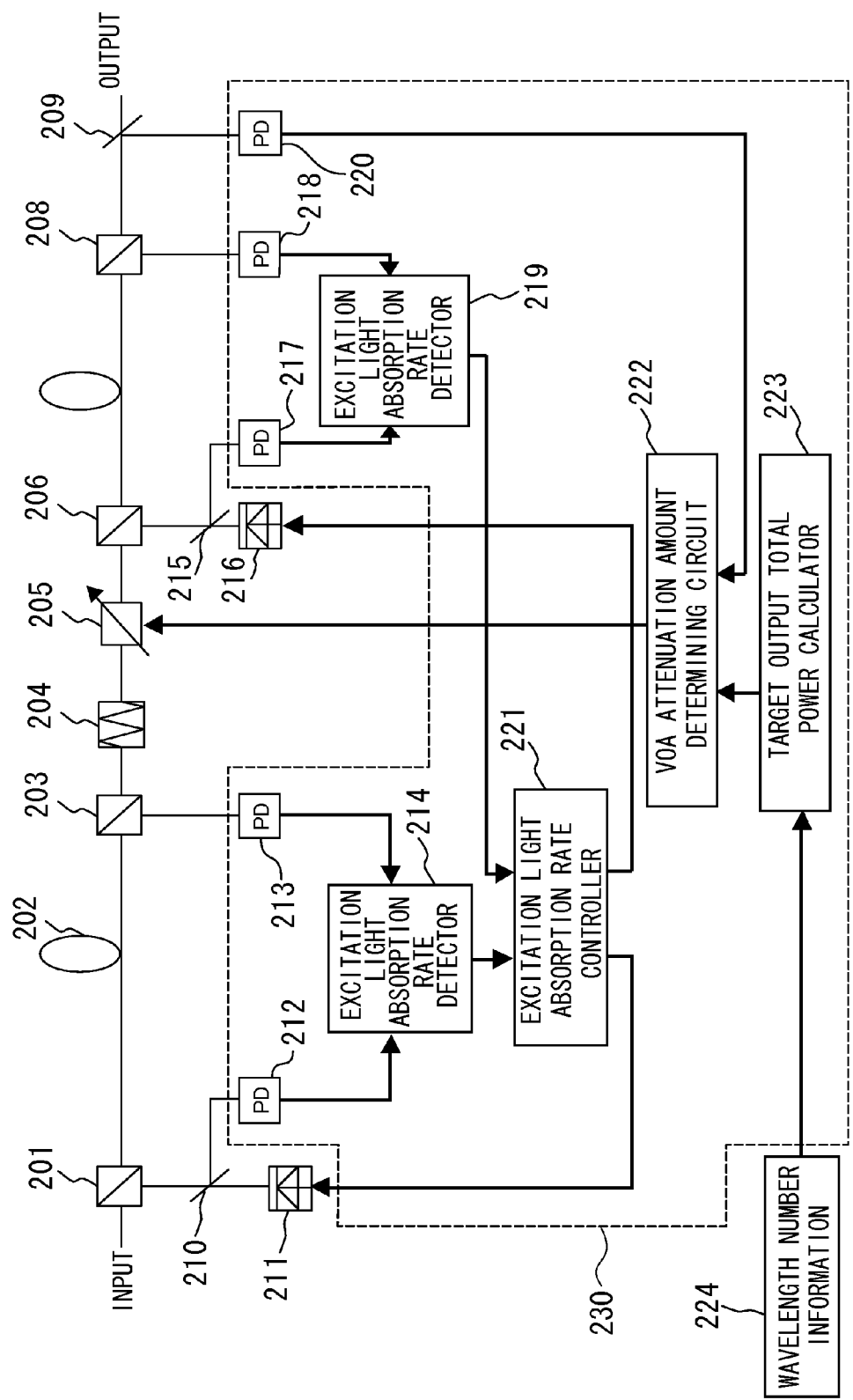
FIG. 2 is a diagram showing a configuration of an optical amplifier of an embodiment.

FIG. 2 shows a configuration of an optical amplifier of an embodiment that does not use input optical monitor circuit. The optical amplifier includes WDM couplers 201, 203, 206, 208, EDFs 202, 207, GEQ 204, VOA 205, beam splitters 209, 210, 215, excitation light sources 211, 216, and control unit 230. The control unit 230 includes optical monitor circuits 212, 213, 217, 218, 220, excitation light absorption rate detectors 214, 219, an excitation light absorption rate controller 221, a VOA attenuation amount determining circuit 222, and a target output total power calculator 223.

The WDM coupler 201, EDF 202, and the excitation light source 211 comprises an optical amplifying unit at a front stage, and the WDM coupler 206, EDF 207 and the excitation light source 216 comprises an optical amplifying unit at a rear stage. A laser diode can be used for the excitation light sources 211 and 216, for example. The arrangement of the optical amplifying units at the front and the rear stages, GEQ 204 and VOA 205 is similar to the arrangement of the optical amplifying units at the front and rear stages, GEQ 54 and VOA 55 of the optical amplifier shown in FIG. 21.

The beam splitter 210 at the front stage splits an excitation light from the excitation light source 211 into two, and outputs one split light to the WDM coupler 201 and outputs the other split light to the optical monitor circuit 212. The optical monitor circuit 212 detects a light power input from the beam splitter 210, and outputs a electrical signal representing a detection result to the excitation light absorption rate detector 214. The optical monitor circuit 213 detects a light power input from the WDM coupler 203 and outputs a electrical signal representing a detection result to the excitation light absorption rate detector 214.

Figure 3:
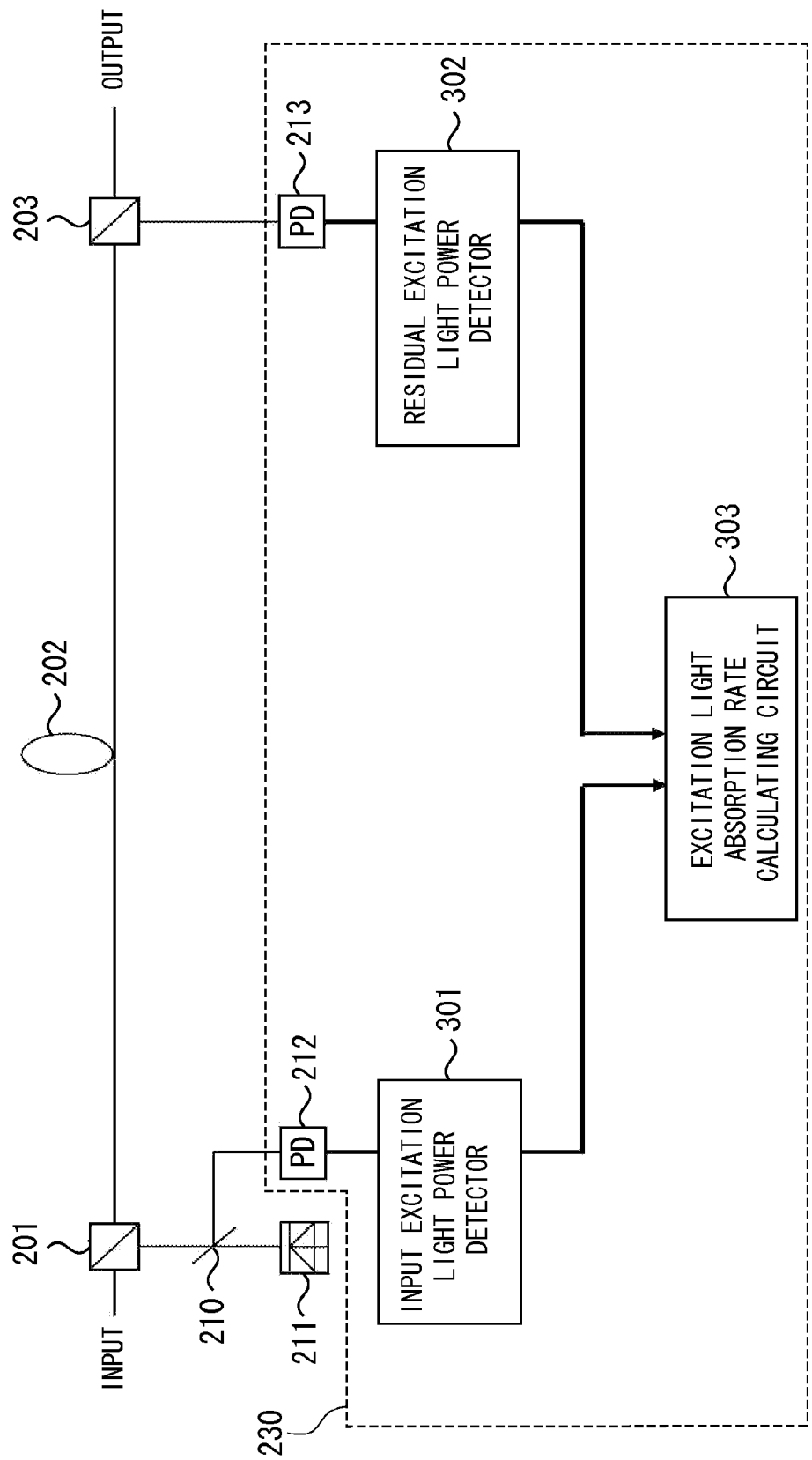
FIG. 3 is a diagram showing a configuration of an excitation light absorption rate detector.

FIG. 3 is a diagram showing a configuration of an excitation light absorption rate detector; As shown in FIG. 3, the excitation light absorption rate detector 214 comprises an input excitation light power detector 301, a residual excitation light power detector 302 and an excitation light absorption rate calculating circuit 303. The input excitation light power detector 301 detects the input excitation light power input from EDF 202 on the basis of the signal from the optical monitor circuit 212, and outputs a signal representing the detection result to the excitation light absorption rate calculating circuit 303. The residual excitation light power detector 302 detects the residual excitation light power remaining in the output light from EDF 202 on the basis of the signal from the optical monitor circuit 213, and outputs a signal representing the detection result to the excitation light absorption rate calculating circuit 303.

The excitation light absorption rate calculating circuit 303 calculates an excitation light absorption rate from the input excitation light power and the residual excitation light power. The excitation light absorption rate is represented by the difference between the input excitation light power and the residual excitation light power which are logarithmically represented, and it corresponds to the absorption amount of excitation light in EDF 202. In the case of antilogarithm representation, the excitation light absorption rate corresponds to the rate of the residual excitation light power to the input excitation light power. The thus-calculated excitation light absorption rate is output to the excitation light absorption rate controller 221 of FIG. 2.

Likewise, the beam splitter 215 at the rear stage splits the excitation light from the excitation light source 216 into two parts, and outputs one split light to the WDM coupler 206 while outputting the other split light to the optical monitor circuit 217. The optical monitor circuit 217 detects the light power input from the beam splitter 215, and outputs the detected light power to the excitation light absorption rate detector 219. The optical monitor circuit 218 detects the light power input from the WDM coupler 208 and outputs the detected light power to the excitation light absorption rate detector 219.

The excitation light absorption rate detector 219 has the same configuration as the excitation light absorption rate detector 214, calculates the excitation light absorption rate from the input excitation light power and the residual excitation light power in EDF 208, and outputs the calculated excitation light absorption rate to the excitation light absorption rate controller 221.

The excitation light absorption rate controller 221 controls the sum of the excitation light absorption rates of EDFs 202 and 208 so that the sum concerned is kept constant, whereby the sum of the gains of the EDFs are kept constant. However, in this case, the excitation light wavelengths of the excitation light sources 211 and 216 are assumed to be equal to each other.

FIG. 4 shows a gain-wavelength characteristics of EDF. The operation of EDF varies in accordance with an average inverted distribution rate t, which represents an exciting state of EDF. Curved lines 401, 402, 403, 404, and 405 represent gain-wavelength characteristic of EDF in cases of t=0.7, t=0.65, t=0.6, t=0.55, and t=0.5, respectively. As shown in FIG. 4, as t increases, the absorption rate of the excitation light wavelength (for example, 1.48 μm) decreases. In other words, as t increases, the negative gain of the excitation light wavelength approaches to zero.

Considering the relationship between a gain in the excitation light wavelength band and a gain in the transmission wavelength band, the gain of the transmission wavelength band increases as the absorption rate of the excitation light wavelength decreases, that is, as the negative gain of the excitation light wavelength approaches to zero. Furthermore, if the absorption rate of the excitation light wavelength is determined, the gain-wavelength characteristic would be determined.

By using this property, the excitation light absorption rate controller 221 adjusts the excitation light power of the excitation light sources 211 and 216, so that the sum of the absorption rates of the two EDFs approaches to a target value, thereby keeping the sum of the gains of the two EDFs constant. By controlling the excitation light power as described above, the optical amplifier operates as an AGC amplifier, and a constant gain can be obtained irrespective of the number of wavelengths.

Figure 5A:
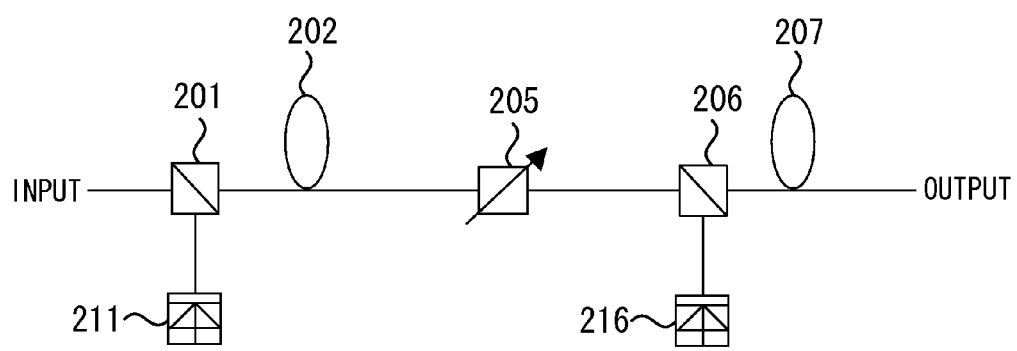
FIG. 5A and FIG. 5B are diagrams showing a configuration of an optical amplifier and a level diagram of a first control method.
Figure 5B:
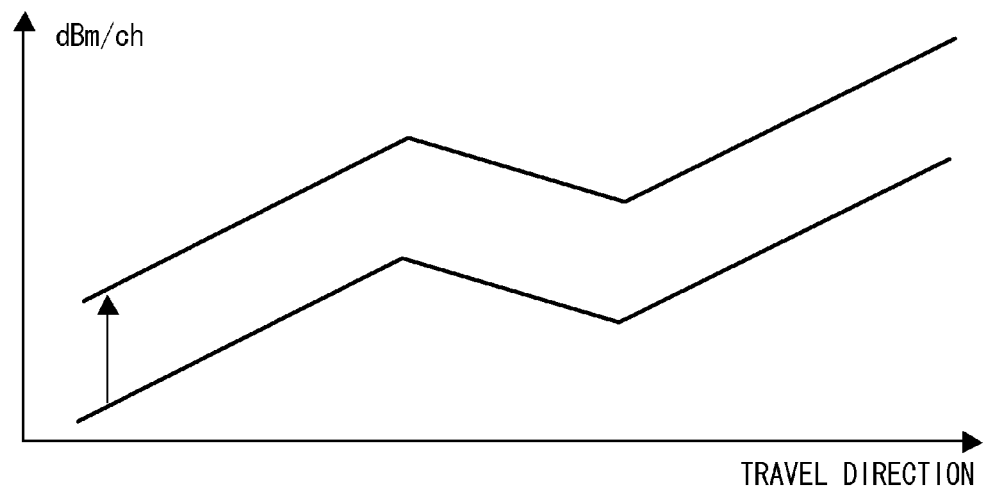

FIG. 5A and FIG. 5B are diagrams showing a configuration and a level diagram of a first control method. The first control method uses the excitation light control based on the excitation light absorption rate. In the first control method, when the input level of the input light changes, output level also changes because the optical amplifier operates at the same gain irrespective to the input level.

Figure 6A:
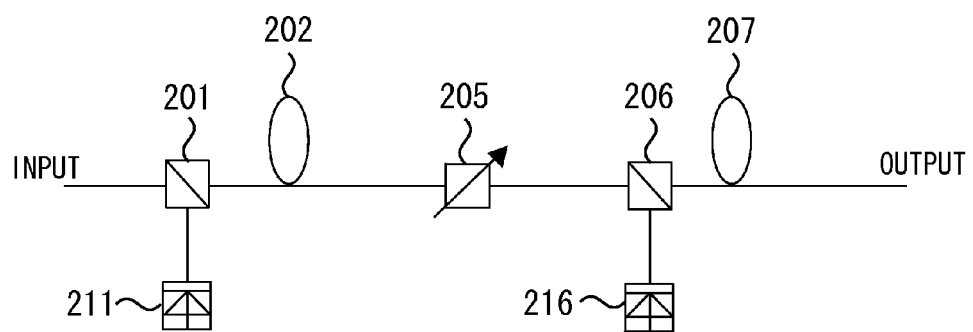
FIG. 6A and FIG. 6B are diagrams showing a configuration of an optical amplifier and a level diagram of a second control method.
Figure 6B:
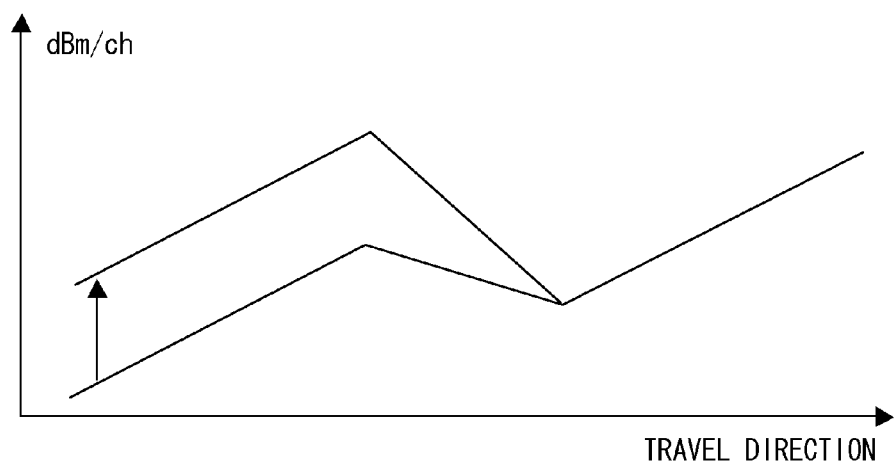

FIG. 6A and FIG. 6B are diagrams showing a configuration of an optical amplifier and a level diagram of a second control method; With the second method, in order to prevent the situation occurs when the input level changes under the first method, the attenuation amount of VOA 205 is adjusted by the VOA attenuation amount determining circuit 222 and the target output total power calculator 223.

The target output total power calculator 223 calculates the target output total power from the wavelength number information 224 input from the external and the target output level, and outputs it to the VOA attenuation amount determining circuit 222. The target output total power is calculated by multiplying the wavelength number to the target output level as the target output light power per wavelength.

The optical monitor circuit 220 detects the light power input from the beam splitter 209, and outputs a signal representing the detection result to the VOA attenuation amount determining circuit 222. The VOA attenuation amount determining circuit 222 determines the attenuation amount of VOA so that the output light power of the optical amplifier input from the optical monitor circuit 220 approaches to the target output total power. Accordingly, as shown in an internal level diagram of FIG. 6B, a constant output level can be obtained even in the case of variation of the input level.

As described above, in the second method, by using the control of the excitation light power and the control of the attenuation amount in combination, a constant flat output level can be maintained without detecting the input light power even when the wavelength number and the input level vary. Furthermore, by detecting the forward power of the excitation light source, deterioration of the excitation light source can be detected.

Those explanations made so far is based on an assumption that, in the optical amplifier of FIG. 2, the rate of amplified spontaneous emission (ASE) occupying in the output power is sufficiently small, even in a situation under one-wavelength operation, and thus the ASE can be negligible. On the other hand, in a situation when the rate of ASE occupying in the output power is not negligible and thus ASE correction is required, another control method can be applied to VOA.

Figure 7:
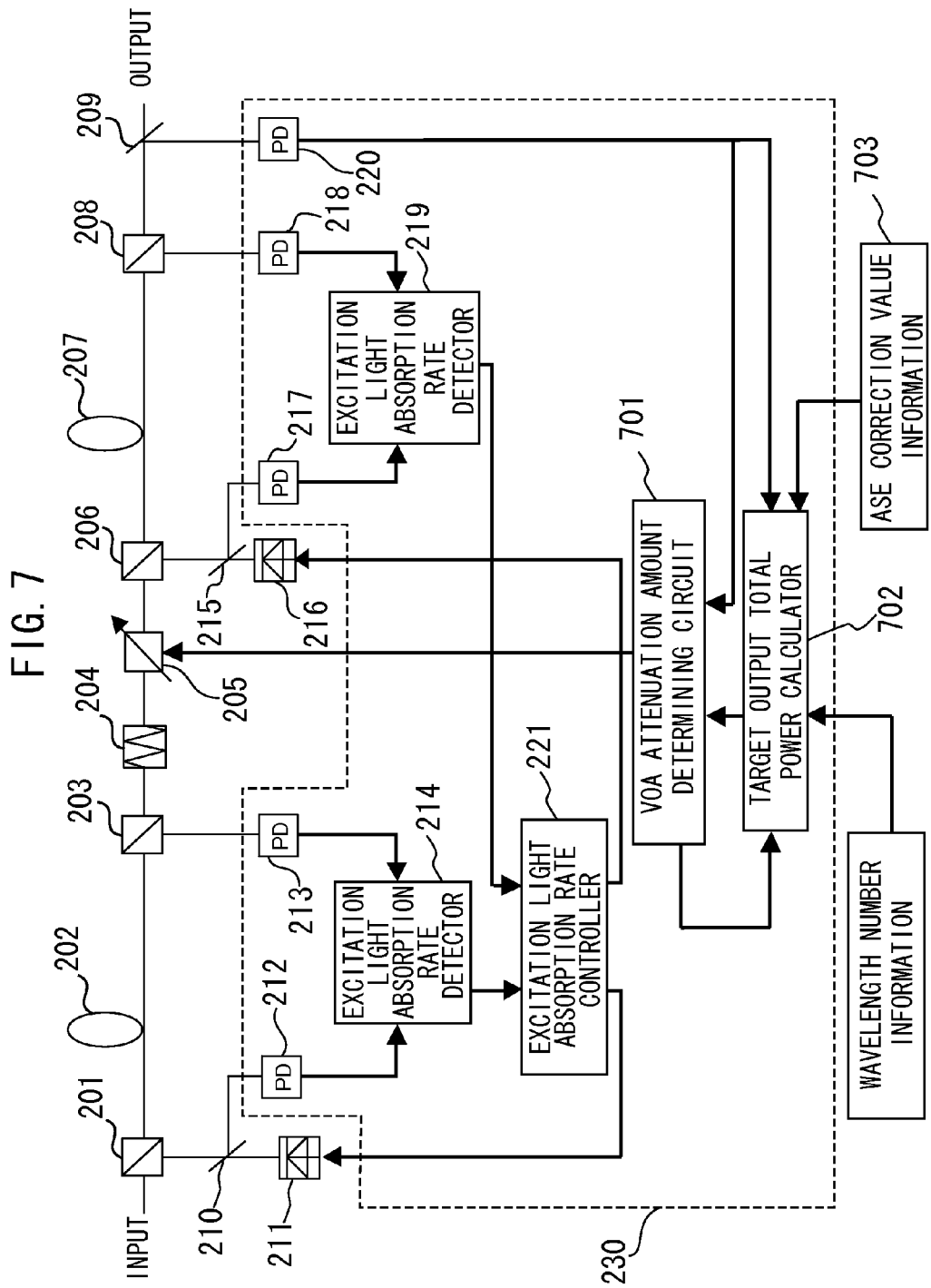
FIG. 7 is a diagram showing a configuration of an optical amplifier of an embodiment.

FIG. 7 shows a configuration of an optical amplifier for performing ASE correction. Comparing to the configuration shown in FIG. 2, the optical amplifier shown FIG. 7 has the configuration with a VOA attenuation amount determining circuit 701 and a target output total power calculator 702, instead of the VOA attenuation amount determining circuit 222 and the target output total power calculator 223 in FIG. 2.

A control method of the excitation light sources 211 and 216 by the excitation light absorption rate controller 221 is the same as the optical amplifier of FIG. 2.

Following is a case where the wavelength band of transmission light has a maximum number of 40 wavelengths, ranging from 1531.9 nm to 1563.9 nm, with an interval of 100 GHz. Also in the case, the input level varies from −30 dBm/ch to −15 dBm/ch, and the target output level is equal to 0 dBm/ch. For amplification, the excitation light wavelengths of the excitation light sources 211 and 216 are equal to 1.48 μm, and the lengths of EDFs 202 and 207 are equal to 9 m and 12 m.

Figure 8:
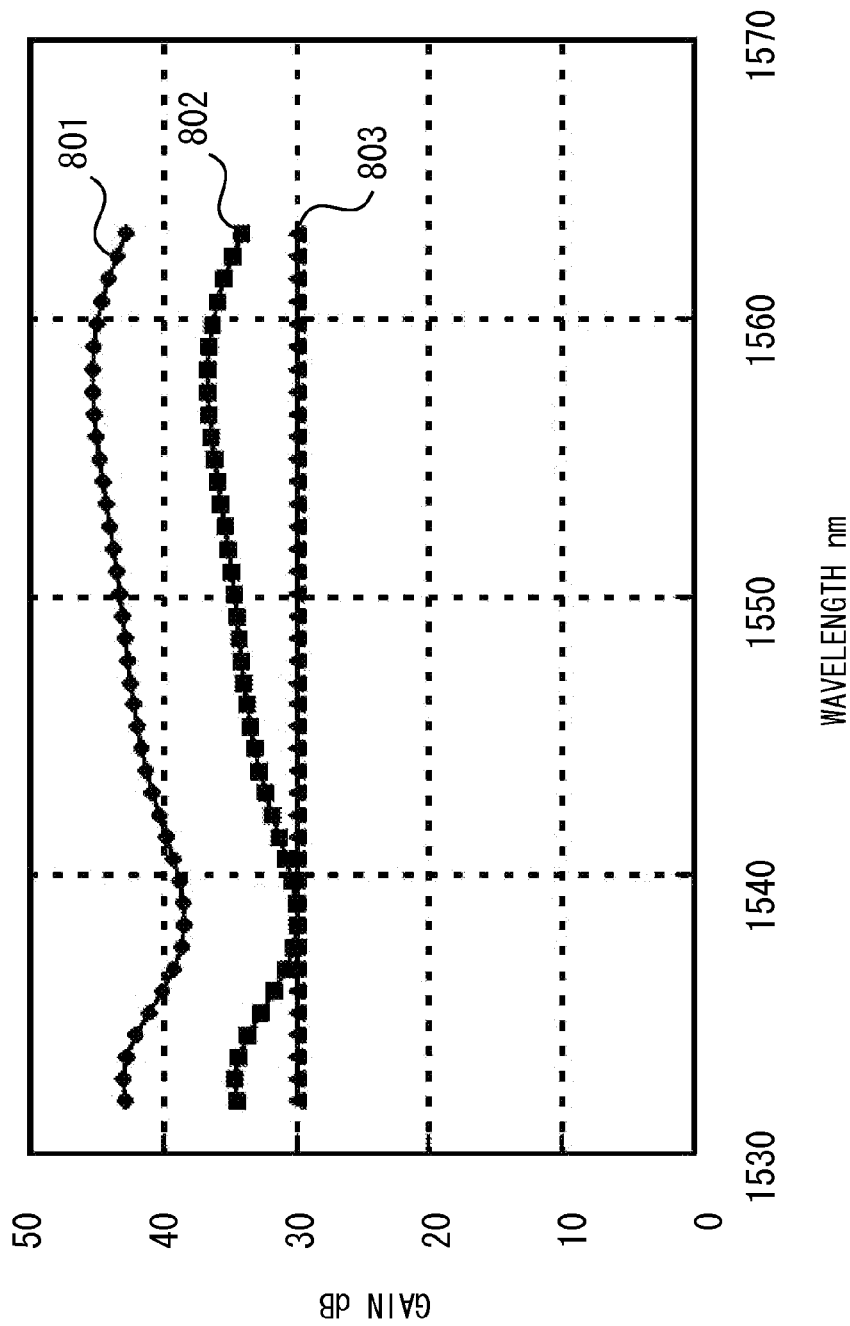
FIG. 8 is a diagram showing a gain-wavelength characteristic of an optical amplifier of an embodiment.

FIG. 8 is a diagram showing a gain-wavelength characteristic of EDF. In this case, a required amplifier gain at the lower limit (−30 dBm/ch) of the input level is equal to 30 dB. Therefore, as shown in FIG. 8, the operating point of EDF is determined so that the minimum gain of the gain-wavelength characteristic 802 obtained by subtracting the optical part loss of the transmission system from the wavelength characteristic 801 of the sum of the gains of two EDFs is equal to 30 dB.

Figure 9:
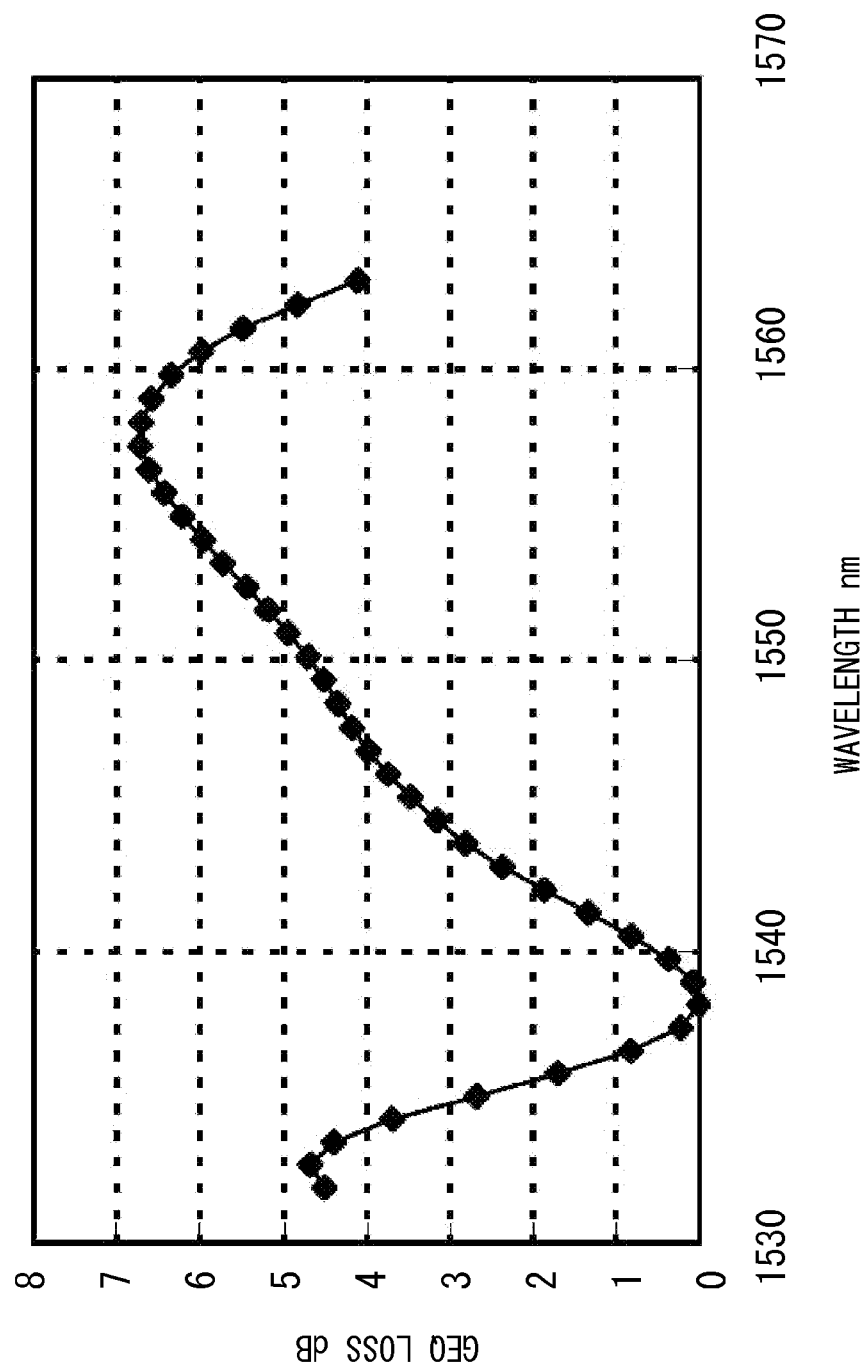
FIG. 9 is a diagram showing a loss-wavelength characteristic of GEQ in an optical amplifier of an embodiment.

FIG. 9 is a diagram showing a loss-wavelength characteristic of the GEQ. The loss-wavelength characteristics of GEQ 204 is determined as shown in FIG. 9 to convert a gain-wavelength characteristic 802 to a flat gain-wavelength characteristic 803.

Figure 10:
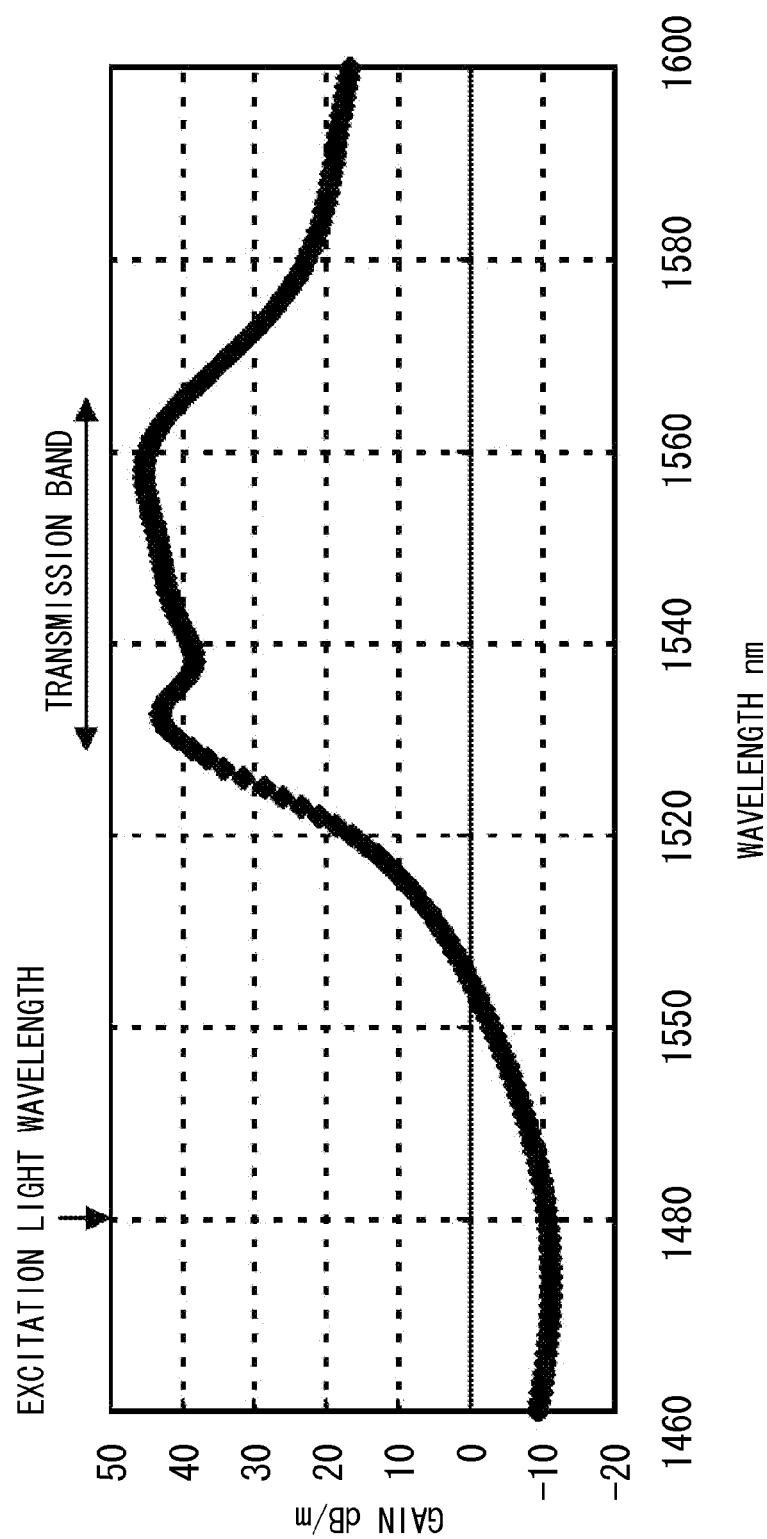
FIG. 10 is a diagram showing a gain-wavelength characteristic of EDF in an optical amplifier of an embodiment.

FIG. 10 is a diagram showing a gain-wavelength characteristic of EDF including a wavelength range outside of the transmission wavelength band. By extending the gain-wavelength characteristic 801 of FIG. 8 to the outside of the transmission band, a characteristic as shown in FIG. 10 is obtained. In this example, the gain at 1.48 μm of the excitation light wavelength is equal to −11.2 dB, and thus it is apparent that if the excitation light power is controlled so that the sum of the excitation light absorption rates of the two EDFs is equal to 11.2 dB, a predetermined EDF gain sum would be obtained. Through this control, the optical amplifier operates as an AGC amplifier and a constant gain can be obtained irrespective of the wavelength number.

Next, the control method of keeping the output level constant with respect to the variation of the input level will be described.

Figure 11:
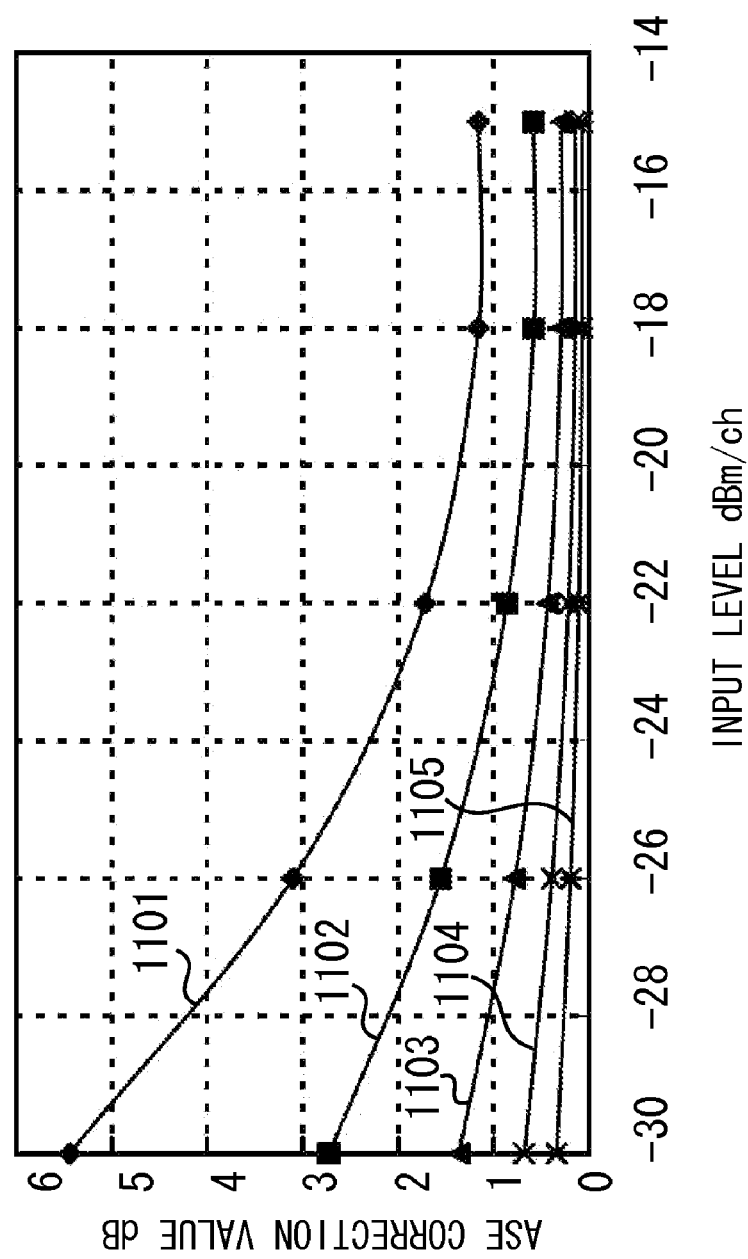
FIG. 11 is a diagram showing ASE correction value information.

FIG. 11 is a diagram showing ASE correction value information. The target output total power calculator 702 holds an ASE correction value information 703 input from the external, and corrects the target output total power calculated from the target output level by using this information. As shown in FIG. 11, the ASE correction value information 703 represents the ASE correction value to the wavelength number and the input level. Curved lines 1101, 1102, 1103, 1104 and 1105 represent the relationship between the input level and the ASE correction value for the wavelength numbers of 1, 2, 4, 8 and 16, respectively.

Figure 12:
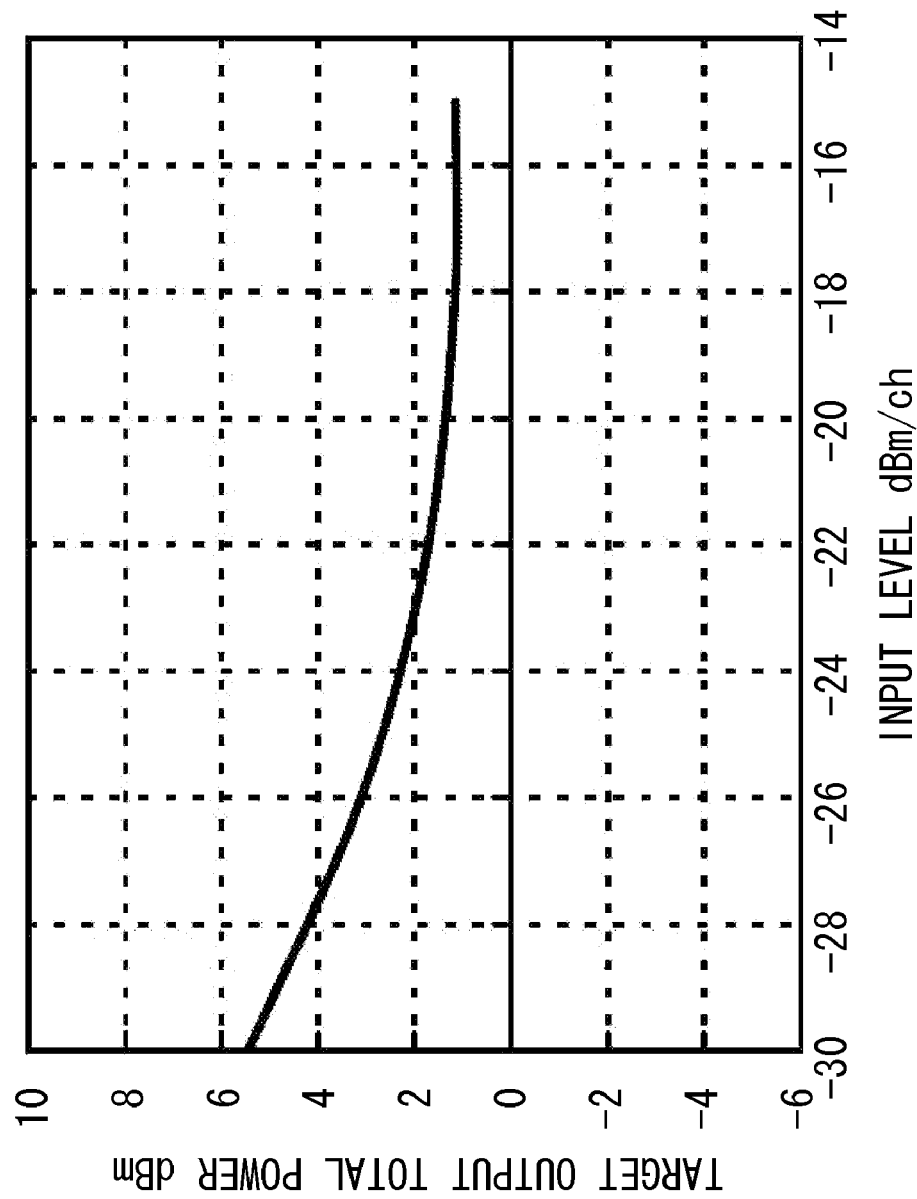
FIG. 12 is a diagram showing a relationship between the input level and a target output total power.

FIG. 12 is a diagram showing a relationship between the input level and a target output total power. The target output total power calculator 702 determines the relationship between the input level at the present wavelength number and the target output total power from the ASE correction value information 703 and the wavelength number information 224. The target output level is equal to 0 dBm/ch, and thus, for example, under one-wavelength operation, the curve line 1101 of FIG. 11 directly represents the target output total power, and the relationship as shown in FIG. 12 is obtained.

Figure 20A:
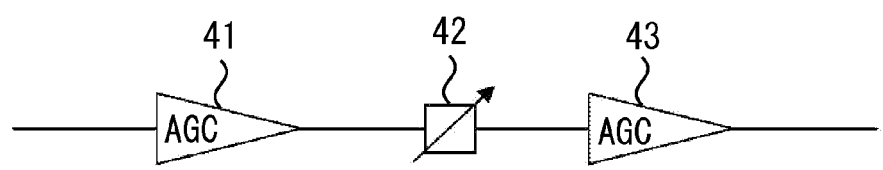
FIG. 20A and FIG. 20B are diagrams showing a fourth amplifying method of an related art.
Figure 20B:
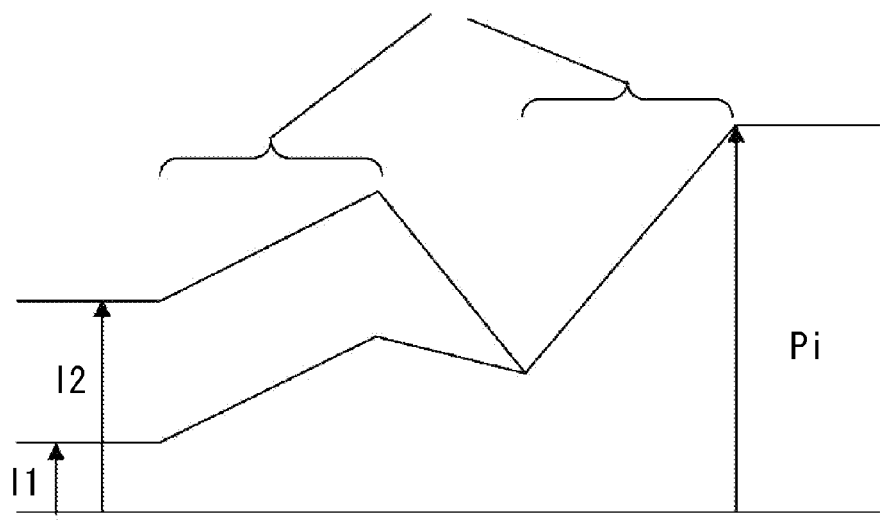

In order to maintain a constant output level even in the case of the variation of the input level, it is required to increase the attenuation amount of VOA by only the increasing amount of the input level as shown in FIG. 20B.

Figure 13:
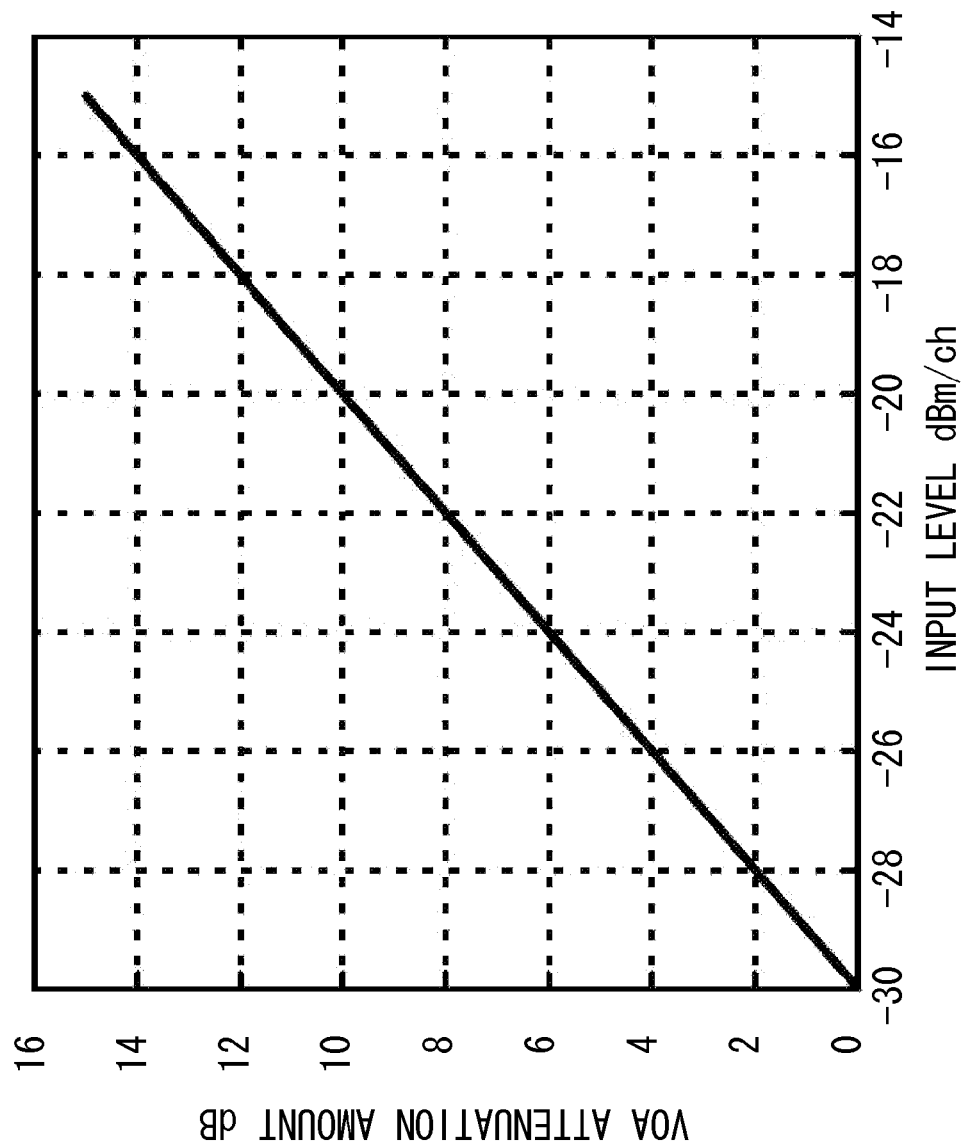
FIG. 13 is a diagram showing a relationship between the input level and the VOA attenuation amount.

FIG. 13 is a diagram showing a relationship between the input level and the VOA attenuation amount, with a line having a gradient of 1.

Figure 14:
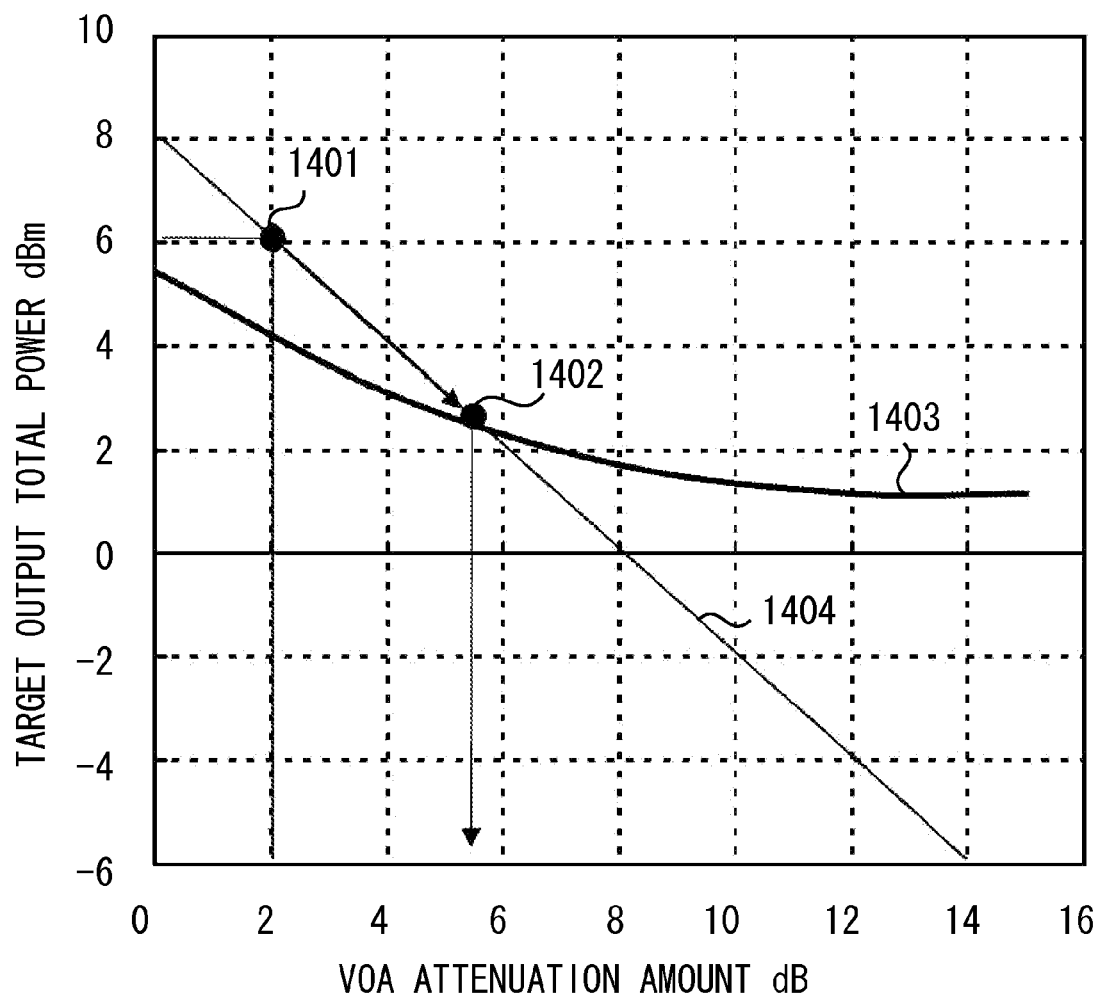
FIG. 14 is a diagram showing a VOA attenuation amount determining procedure.

FIG. 14 is a diagram showing a VOA attenuation amount determining procedure. Changing the abscissa axis of FIG. 12 from the input level to the VOA attenuation amount by using this relationship, a curved line 1403 represents a relationship between the VOA attenuation amount and the target output total power, as shown in FIG. 14.

Therefore, the VOA attenuation amount determining circuit 222 determines the VOA attenuation amount for keeping the output level constant by using the obtained relationship between the VOA attenuation amount and the target output total power. First, the VOA attenuation amount determining circuit 222 plots the output total power at the present VOA attenuation amount. For example, when the present VOA attenuation amount is equal to 2 dB and the output total power is equal to 6 dBm, the position of a point 1401 of FIG. 14 is an initial value. It is apparent that at the attenuation amount of this point, the output total power is upwardly displaced from the target output total power on a curved line 1403 by about 1.7 dB.

Here, it may be estimated that the increase of the VOA attenuation amount and the reduction of the output power are in one-to-one correspondence, and thus a line 1404 which passes through the point 1401 and has a gradient of −1 is determined. The cross point between the line 1404 and the curved line 1403 is determined, and the VOA attenuation amount at this point, that is, 5.5 dB is determined as the target value.

FIG. 15 shows details of the input excitation light power of the EDFs at the front and rear stages, the residual excitation light power and the excitation light absorption rates under the operation of 40 wavelengths. In this case, the excitation light sources 211 and 216 are controlled so that the sum of the excitation light absorption rates at the front and rear stages is equal to 11.2 dB with respect to the variation of the input level.

Figure 16A:
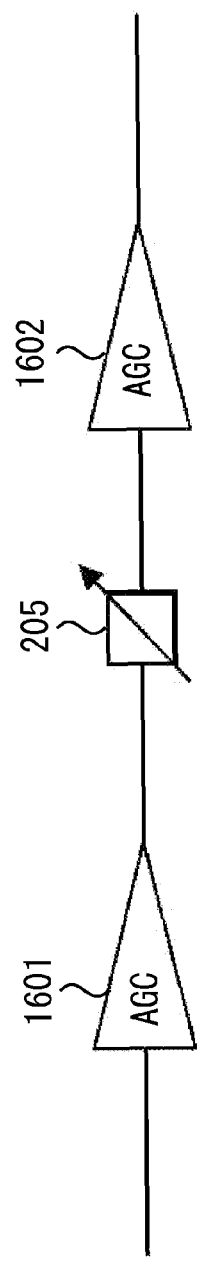
FIG. 16A and FIG. 16B are configuration and diagram showing a power level of an optical amplifier of an embodiment.
Figure 16B:
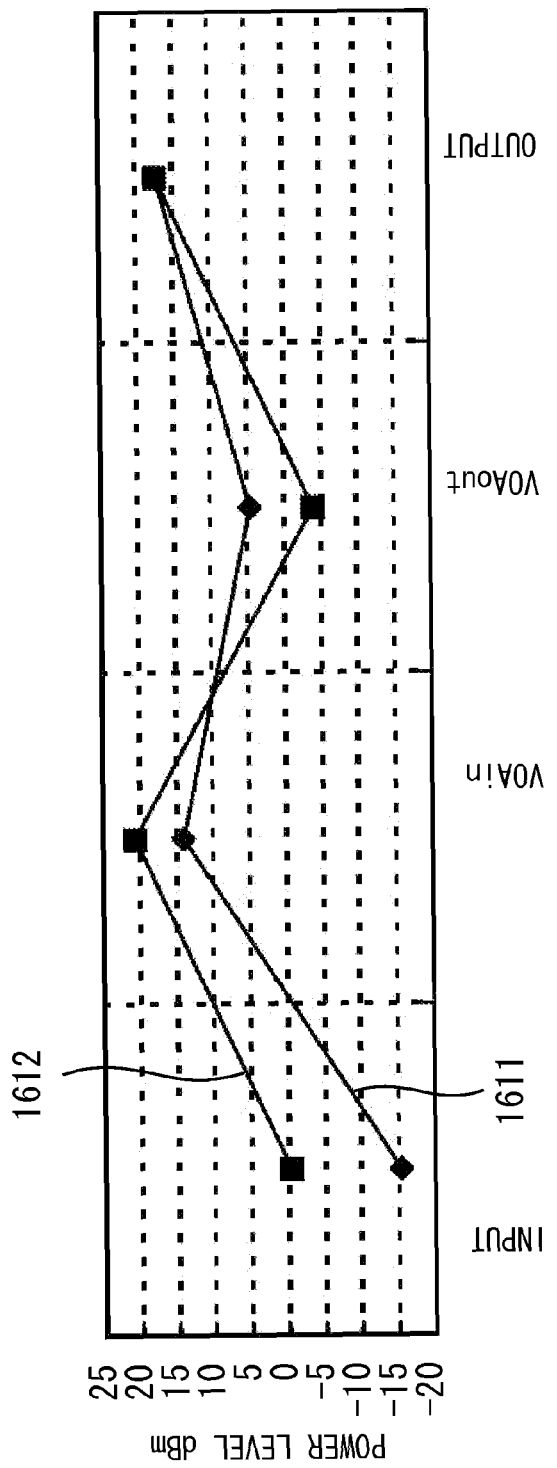
Figure 17A:
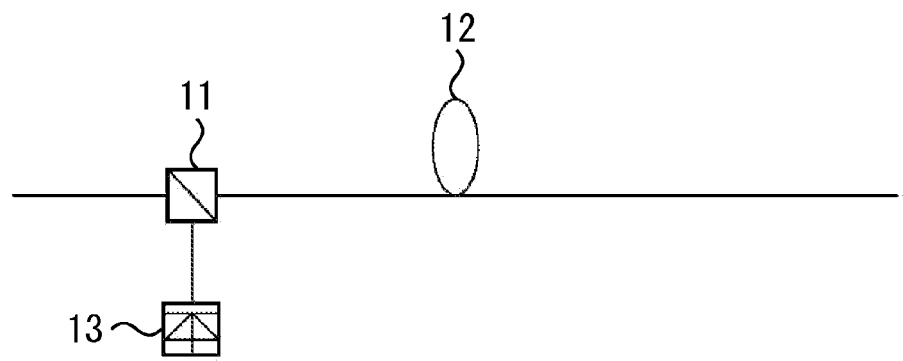
FIG. 17A and FIG. 17B are diagrams showing a first amplifying method of an related art.
Figure 17B:
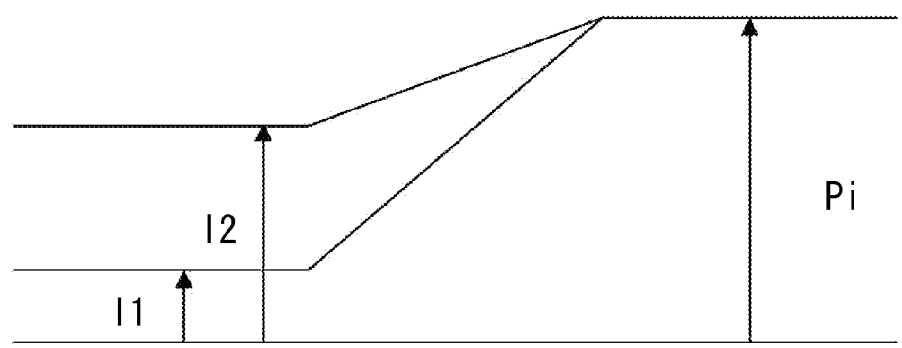
Figure 18A:
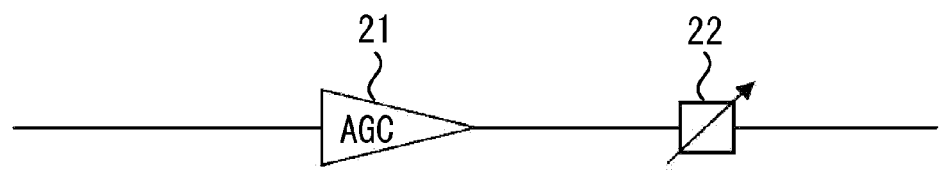
FIG. 18A and FIG. 18B are diagrams showing a second amplifying method of an related art.
Figure 18B:
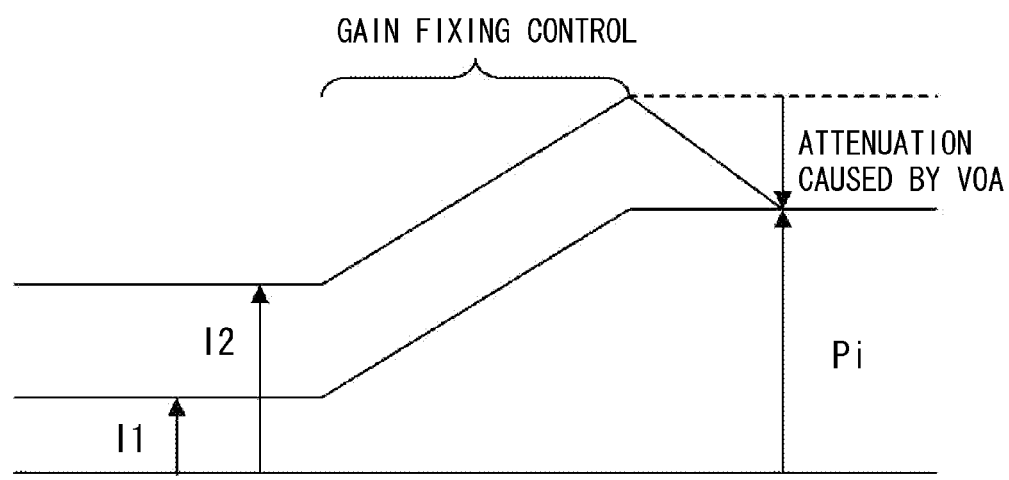
Figure 19A:
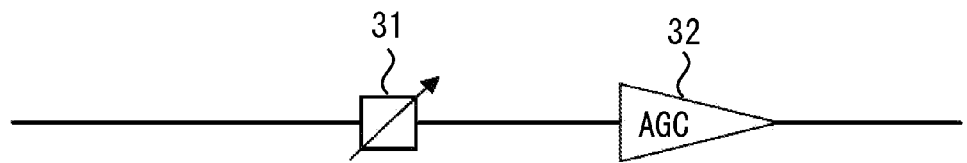
FIG. 19A and FIG. 19B are diagrams showing a third amplifying method of an related art.
Figure 19B:
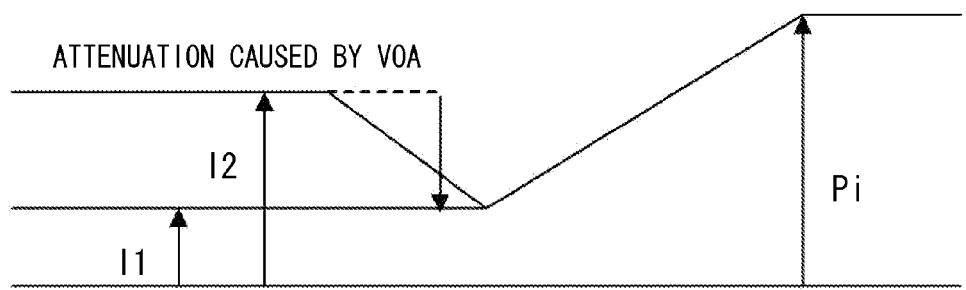

FIG. 16A and FIG. 16B show a configuration and an internal level diagram under the operation of the 40 wavelengths. Optical amplifying units 1601 and 1602 correspond to optical amplifying units at the front and rear stages respectively, and broken lines 1611 and 1612 represent the internal variations of the optical power for the input levels of −30 dBm/ch and −15 dBm/ch, respectively. In this case, at the lower limit of the input level (−30 dBm/ch), NF is equal to 6.3 dB, and at the upper limit of the input level (−15 dBm/ch), NF is equal to 12.6 dB. Accordingly, excellent values are obtained for NF.

In the optical amplifiers explained above, it is assumed that the excitation light wavelengths at the front and rear stages are equal. However, even when they are different, the control method using the excitation light absorption rate can be performed.

For example, the excitation light absorption rates of EDF at 0.98 μm and 1.48 μm are determined according to the following equations on the basis of a giles model.

$$L(0.98) = \alpha(0.98)(1-t) - g^*(0.98)t \qquad (1)$$

$$L(1.48) = \alpha(1.48)(1-t) - g^*(1.48)t \qquad (2)$$

The definition of each parameter is as follows.

L(0.98): the excitation light absorption rate [dB] of EDF at 0.98 μm, L(1.48) the excitation light absorption rate [dB] of EDF at 1.48 μm, α(0.98): the absorption coefficient [dB] of EDF at 0.98 μm, α(1.48): the absorption coefficient [dB] of EDF at 1.48 μm, g*(0.98): the radiative coefficient [dB] of EDF at 0.98 μm, g*(1.48) the radiative coefficient [dB] of EDF at 1.48 μm, and t: average inverted distribution rate.

From the equations (1) and (2), the relational expression between L(0.98) and L(1.48) is represented as follows.

$$L(1.48) = \left(\frac{\alpha(1.48)g^*(0.98) - \alpha(0.98)g^*(1.48)}{\alpha(0.98) + g^*(0.98)}\right) + \left(\frac{\alpha(1.48) + g^*(1.48)}{\alpha(0.98) + g^*(0.98)}\right)L(0.98) \qquad (3)$$

Furthermore, the following numerical values are used as the values of the absorption coefficient and the radiative coefficient.

α(0.98):6.72 [dB], α(1.48):3.61 [dB], g*(0.98) 0 [dB] and g*(1.48) 1.3[dB]

By substituting these numerical values into the equation (3), the following equation is obtained.

$$L(1.48) = -0.57 + 0.73 \cdot L(0.98) \qquad (4)$$

When both the excitation light wavelengths at the front and rear stages are equal to 1.48 μm, the excitation light sources 211 and 216 may be controlled so as to satisfy the following equation by setting the excitation light absorption rates at the front and rear stages to L(1.48 front stage) and L(1.48 rear stage), respectively.

$$L(1.48 \text{ front stage}) + L(1.48 \text{ rear stage}) = 11.2 [dB] \qquad (5)$$

On the other hand, when the excitation light wavelength at the front stage is equal to 0.98 μm and the excitation light wavelength at the rear stage is equal to 1.48 μm, L(0.98 front stage) is detected by the excitation light absorption rate detector 214 at the front stage, and thus the equation (5) cannot be directly used. In this case, the following equation is satisfied from the equation (4).

$$L(1.48 \text{ front stage}) = -0.57 + 0.73 \cdot L(0.98 \text{ front stage}) \qquad (6)$$

Therefore, by substituting L(1.48 front stage) of the equation (6) into the equation (5), the following equation is obtained.

$$-0.57 + 0.73 \cdot L(0.98 \text{ front stage}) + L(1.48 \text{ rear stage}) = 11.2 [dB] \qquad (7)$$

Accordingly, the excitation light sources 211 and 216 are controlled so that the equation (7) is satisfied, that is, the sum of the converted value obtained by converting the excitation light absorption rate of EDF 202 to the same excitation light wavelength as EDF 208 and the excitation light absorption rate of EDF 208 is kept constant.

In the optical amplifiers shown in FIGS. 2 and 7, EDF is used as the amplifying media in the optical amplifying units at the front and rear stages. However, another amplifying medium such as a rare-earth doped waveguide or the like may be used.

Furthermore, the optical monitor circuit is provided to detect the excitation light power input to the optical amplifying unit. However, in place of the optical monitor circuit, the excitation light power may be detected from the current of the laser diode used as the excitation light source. In this case, the relationship between the current and the excitation light power is input to the excitation light absorption rate detectors 214 and 219 achieve in advance. Under the actual operation, the excitation light power corresponding to the present current value is determined on the basis of the relationship concerned, and used to calculate the excitation light absorption rate.

Although a few preferred embodiments of the present invention have been shown and described, it would be appreciated by those skilled in the art that changes may be made in these embodiments without departing from the principles and spirit of the invention, the scope of which is defined in the claim and their equivalents.

What is claimed is:

1. An optical amplifier comprising:
   a first amplifier that amplifies an input light by utilizing a first excitation light and thereby outputting a first amplified light;
   a second amplifier that amplifies the first amplified light by utilizing a second excitation light and thereby outputting a second amplified light; and
   an absorption rate detector that detects a first absorption rate of the first excitation light and a second absorption rate of the second excitation light; and
   a level controller that controls a level of the first excitation light and a level of second excitation light based on the detected first absorption rate and the detected second absorption rate, wherein
   the first absorption rate corresponds to a ratio of the first excitation light absorbed in the first amplifier, and
   the second absorption rate corresponds to a ratio of the second excitation light absorbed in the second amplifier.

2. The optical amplifier according to claim 1, wherein the level controller controls the level of the first excitation light and the level of the second excitation light to make a sum of the first absorption rate and the second absorption rate to be constant.

3. The optical amplifier according to claim 1, wherein a wavelength of the first excitation light and a wavelength of the second excitation light are different.

4. The optical amplifier according to claim 3, wherein control of the level controller is based on a converted absorption rate, which is calculated from the first absorption rate or the second absorption rate and wavelengths of the first excitation light and the second excitation light.

5. The optical amplifier according to claim 1, further comprising a first light source that outputs the first excitation light and a second light source that outputs the second excitation light.

6. The optical amplifier according to claim 1, wherein the absorption rate detector includes:
   a first excitation light monitor that monitors a level of the first excitation light before utilized in the first amplifier,
   a second excitation light monitor that monitors a level of the second excitation light before utilized in the second amplifier,
   a first residual excitation light monitor that monitors a level of the first excitation light after utilized in the first amplifier, and
   a second residual excitation light monitor that monitors a level of the second excitation light after utilized in the second amplifier, and
   an absorption rate controller that calculates the first absorption rate based on monitored results of the first excitation light monitor and the first residual excitation light monitor, and that calculates the second absorption rate based on monitored results of the second excitation light monitor and the second residual excitation light monitor.

7. The optical amplifier according to claim 1, further comprising:
   an attenuator that is disposed between the first amplifier and the second amplifier, and that attenuates the first amplified light, and
   a level detector that detects an input level and an output level of the optical amplifier,
   wherein the level controller controls the attenuator based on the detected input level and output level of the optical amplifier.

8. The optical amplifier according to claim 7, wherein the level controller controls the attenuator based on a number of wavelengths input in the optical amplifier.

9. The optical amplifier according to claim 7, wherein the level controller controls the attenuator based on a spontaneous emission light correction value, which is calculated from the wavelength number and the input level per one wavelength.

10. An optical amplifier comprising a first amplifier and a second amplifier disposed after the first amplifier, wherein,
    a level of a first excitation light supplied to the first amplifier and a level of a second excitation light supplied to the second amplifier, are controlled based on a detected absorption of the first excitation light in the first amplifier and a detected absorption of the second excitation light in the second amplifier.

11. The optical amplifier according to claim 10, wherein the level of the first excitation light supplied to the first amplifier and the level of the second excitation light supplied to the second amplifier are controlled to make a sum of the detected absorption of the first excitation light and the detected absorption of second excitation light to be constant.

12. The optical amplifier according to claim 10, wherein a wavelength of the first excitation light and a wavelength of the second excitation light are different.

13. The optical amplifier according to claim 12, wherein the level of the first excitation light supplied to the first amplifier and the level of the second excitation light supplied to the second amplifier are controlled based on a converted absorption rate, which is calculated from the absorption of the first excitation light, the absorption of second excitation light, and the wavelengths of the first excitation light and the second excitation light.

14. An optical amplifying method comprising:
    amplifying an input light by a first excitation light and thereby outputting a first amplified light;
    amplifying the first amplified light by a second excitation light and thereby outputting an output light; and
    controlling a level of the first excitation light and the second excitation light based on a detected absorption of the first excitation light in amplifying the input light and a detected absorption of the second excitation light in amplifying the first amplified light.

15. The optical amplifying method according to claim 14, further comprising:
    controlling the level of the first excitation light and the level of the second excitation light to make a sum of the detected absorption of the first excitation light in amplifying the input light and the detected absorption of the second excitation light in amplifying the first amplified light to be constant.

16. An optical apparatus comprising:
    a first optical amplifier to amplify an input light by a first excitation light and to thereby output a first amplified light;
    a second optical amplifier to amplify the first amplified light by a second excitation light and to thereby output an output light; and
    a controller to control a level of the first excitation light and the second excitation light based on detected absorption of the first excitation light by the first optical amplifier and detected absorption of the second excitation light by the second optical amplifier.

* * * * *

UNITED STATES PATENT AND TRADEMARK OFFICE
CERTIFICATE OF CORRECTION

PATENT NO. : 8,077,383 B2
APPLICATION NO. : 12/053816
DATED : December 13, 2011
INVENTOR(S) : Tomoaki Takeyama et al.

It is certified that error appears in the above-identified patent and that said Letters Patent is hereby corrected as shown below:

Column 12, Line 16, In Claim 10, delete "amplifier," and insert -- amplifier --, therefor.

Signed and Sealed this
Sixth Day of March, 2012

David J. Kappos
*Director of the United States Patent and Trademark Office*